(12) United States Patent
Ohkimoto et al.

(10) Patent No.: US 11,732,061 B2
(45) Date of Patent: *Aug. 22, 2023

(54) LIQUID COMPOSITION, DEVICE, METHOD OF MANUFACTURING POROUS RESIN, POROUS RESIN, PRODUCT, AND METHOD OF MANUFACTURING POROUS RESIN

(71) Applicant: RICOH COMPANY, LTD., Tokyo (JP)

(72) Inventors: Miku Ohkimoto, Kanagawa (JP); Keigo Takauji, Kanagawa (JP); Hideo Yanagita, Tokyo (JP); Toru Ushirogochi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 150 days.

This patent is subject to a terminal disclaimer.

(21) Appl. No.: 17/336,827

(22) Filed: Jun. 2, 2021

(65) Prior Publication Data

US 2021/0284761 A1 Sep. 16, 2021

Related U.S. Application Data

(62) Division of application No. 16/727,443, filed on Dec. 26, 2019, now Pat. No. 11,053,327.

(30) Foreign Application Priority Data

| Dec. 26, 2018 | (JP) | 2018-242225 |
| Oct. 31, 2019 | (JP) | 2019-198476 |
| Nov. 25, 2019 | (JP) | 2019-212264 |

(51) Int. Cl.

| C08F 2/46 | (2006.01) |
| C08G 61/04 | (2006.01) |
| C08F 2/48 | (2006.01) |
| B41M 5/00 | (2006.01) |
| B41M 5/52 | (2006.01) |
| C08F 2/06 | (2006.01) |
| C08F 2/44 | (2006.01) |

(52) U.S. Cl.
CPC ............. *C08F 2/48* (2013.01); *B41M 5/0017* (2013.01); *B41M 5/5209* (2013.01); *C08F 2/06* (2013.01); *C08F 2/44* (2013.01)

(58) Field of Classification Search
CPC ........ C08F 122/1006; C08F 2/48; C08F 2/44; C08F 2/06; C08F 222/102; C08F 222/103; B41M 5/5209; B41M 5/0017; C08J 9/286; C08J 2335/00; C08J 2201/0502
USPC .............................................. 522/3, 1; 520/1
See application file for complete search history.

(56) References Cited

U.S. PATENT DOCUMENTS

| 5,612,153 A | * | 3/1997 | Moulton et al. | |
| 11,053,327 B2 | * | 7/2021 | Ohkimoto | ............ B41M 5/5209 |
| 2007/0167538 A1 | | 7/2007 | Mochizuki et al. | |
| 2018/0201746 A1 | * | 7/2018 | Hessing et al. | |
| 2020/0321616 A1 | | 10/2020 | Takauji et al. | |

FOREIGN PATENT DOCUMENTS

| CN | 111492508 | | 8/2020 |
| JP | 2001-010221 | * | 1/2001 |
| JP | 2003191628 | * | 7/2003 |
| JP | 2004-051783 | * | 9/2004 |
| KR | 2007-0066969 | | 6/2007 |
| WO | 2019/124276 A | * | 6/2019 |

OTHER PUBLICATIONS

Hegi et al, JP 2003-191628 Machine Translation, Jul. 9, 2003 (Year: 2003).*
Partial European Search Report dated Mar. 25, 2020, in Patent Application No. 19219585.7, 11 pages.*
Mohamed et al, Porous Copolymer Resins: Tuning Pore Structure and Surface Area with Non Reactive Progens, Nanomaterials, 2012, 2, pp. 163-186 (Year: 2012).*
Korean Grant of Patent dated Apr. 26, 2022, in Korean Application No. 10-2019-0171862, with partial English translation, 7 pages.
Chinese Office Action dated Feb. 25, 2022 in Chinese Application No. 201911365413.9, 13 pages.

* cited by examiner

*Primary Examiner* — Jessica Whiteley
(74) *Attorney, Agent, or Firm* — Grüneberg and Myers PLLC

(57) ABSTRACT

A liquid composition that contains a polymerizable compound and a solvent, and that can form a porous resin. The liquid composition, when stirred, transmits at least 30 percent of incident light having a wavelength of 550 nm. The haze value of an containing the liquid composition increases by 1.0 percent or more when the element containing the liquid composition is cured.

21 Claims, 2 Drawing Sheets

LIQUID COMPOSITION, DEVICE, METHOD OF MANUFACTURING POROUS RESIN, POROUS RESIN, PRODUCT, AND METHOD OF MANUFACTURING POROUS RESIN

CROSS-REFERENCE TO RELATED APPLICATIONS

This patent application is a divisional of U.S. patent application Ser. No. 16/727,443, which is based on and claims priority pursuant to 35 U.S.C. § 119 to Japanese Patent Application Nos. 2018-242225, 2019-198476, and 2019-212264, filed on Dec. 26, 2018, Oct. 31, 2019, and Nov. 25, 2019, respectively, in the Japan Patent Office, the entire disclosures of which are hereby incorporated by reference herein.

BACKGROUND

Technical Field

The present invention relates to a liquid composition, a device, a method of manufacturing a porous resin, a porous resin, a product containing the porous resin, and a method of manufacturing a porous resin.

Description of the Related Art

Porous media and porous membranes can be utilized in a variety of applications, including separation membranes, adsorbing membranes, and lead battery separators, based on their unique functions. Therefore, the application will be wider if there is a porous forming liquid composition that is easy to handle and is easily applicable to various places.

As a method of forming a porous medium, a method of forming a porous medium by laminating fine particles has been proposed. This method requires a solution in which fine particles are dispersed, but it is difficult to stably maintain the dispersion state of the solution containing the fine particles. Further, when a porous medium is formed by plate printing, fine particles wears the application device, which leads to deterioration of product quality over a long time.

SUMMARY

According to embodiments of the present disclosure, provided is a liquid composition that contains a polymerizable compound and a solvent, and that can form a porous resin. The liquid composition, when stirred, transmits at least 30 percent of incident light having a wavelength of 550 nm. The haze value of an containing the liquid composition increases by 1.0 percent or more when the element containing the liquid composition is cured.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
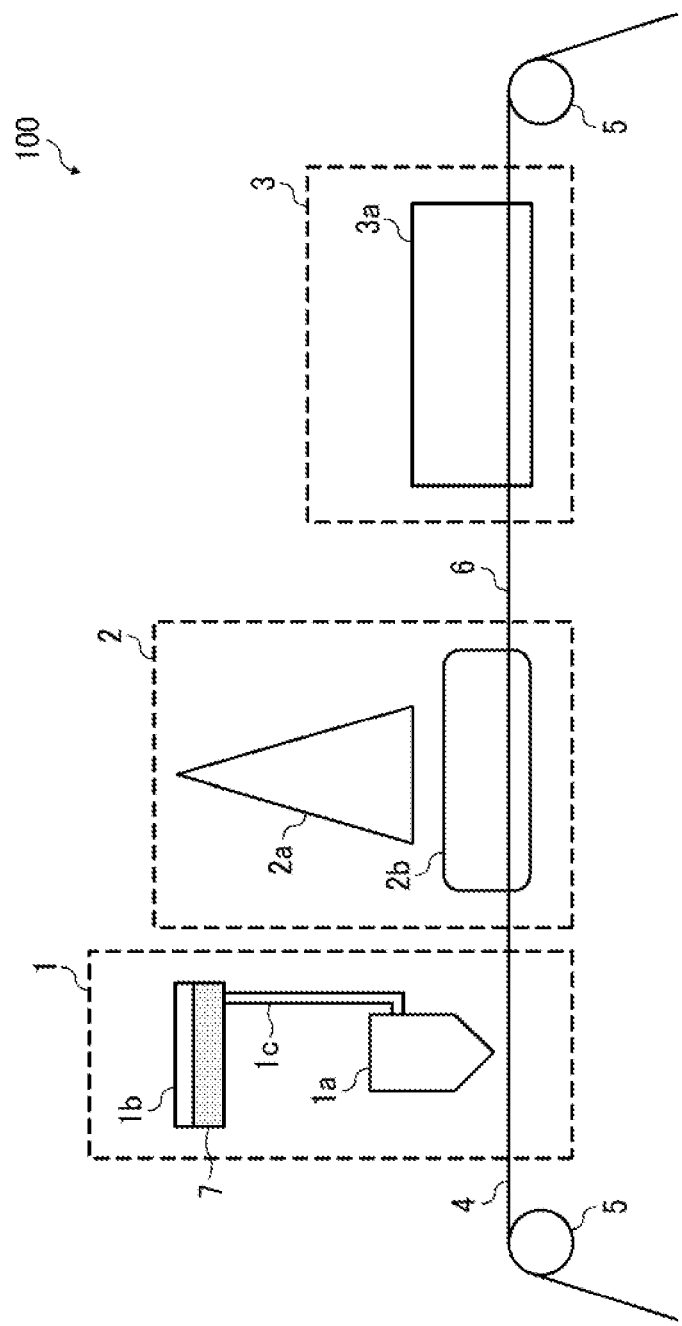
FIG. 1 is a schematic diagram illustrating an example of a device for manufacturing a porous resin that executes a method of manufacturing the porous resin according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

A porous-forming photocurable resin composition has been proposed in JP 2004-51783-A1 which contains a photopolymerizable monomer A, an organic compound B incompatible with the photopolymerizable monomer A, a common solvent C compatible with both the photopolymerizable monomer A and the organic compound B, and a photopolymerization initiator D as requisites.

However, in JP 2004-51783-A1 mentioned above, since it is necessary to mix at least two types of solvents having a specific relationship, it limits the selection of usable materials, thereby making the material designing difficult. Moreover, in order to be a liquid composition for forming a porous resin that can be applicable to various application methods, high compatibility is required between the polymerizable compound and the solvent contained in the liquid composition.

According to the present disclosure, an easily designable liquid composition containing a polymerizable compound and a solvent highly compatible with each other is obtained for forming a porous resin.

Next, an embodiment of the present disclosure is described.

The liquid composition of this embodiment contains a polymerizable compound and a solvent and can form a porous resin, wherein the liquid composition, when stirred, transmits at least 30 percent of incident light having a wavelength of 550 nm and wherein, when an element comprising the liquid composition is cured, the haze value of the element increases by 1.0 percent or more.

Liquid Composition

The liquid composition of this embodiment contains a polymerizable compound, a solvent, and other optional components such as a polymerization initiator. The liquid composition can form a porous resin by curing, etc. For this reason, the liquid composition is preferably used as a liquid for forming a porous resin.

In the present embodiment, "the liquid composition forms a porous resin" not only means that the porous resin is formed in the liquid composition but also a porous resin precursor in the liquid composition is formed and is subject to a subsequent process such as heating process to form the porous resin. Moreover, it also includes not only when the entire liquid composition cures to form a porous resin but also when a part of the liquid composition, which is the polymerizable compound, etc., is caused to cure (i.e., polymerize) to form a porous resin and the rest of the liquid composition, which is the solvent, etc., does not form a porous resin.

Polymerizable Compound

Polymerizable compounds are polymerized to form a resin and further forms a porous resin when polymerized in the liquid composition. The resin formed of the polymerizable compound preferably has a network structure formed upon an application of active energy rays (for example, irradiation of light or application of heat). Preferable examples include, but are not limited to, acrylate resins, methacrylate resins, urethane acrylate resins, vinyl ester resins, unsaturated polyester resins, epoxy resins, oxetane resins, vinyl ether resins, and resins formed by an ene-thiol reaction. In addition, acrylate resins, methacrylate resins, and urethane acrylate resins, which are formed of a polymerizable compound having a (meth)acryloyl group, vinyl ester resins, which are formed by a polymerizable compound having a vinyl group are more preferable in terms of easiness of forming a structure using radical polymerization with high reactivity and productivity and productivity. These can be used alone or in combination. When two or more types are used in combination, the combination of the polymerizable compounds is not particularly limited and can be suitably selected to suit to a particular application. It is preferable to mix a urethane acrylate resins as the main component with other resins to impart flexibility. In the present disclosure, a polymerizable compound having an acryloyl group or a methacryloyl group is referred to as a polymerizable compound having a (meth)acryloyl group.

The active energy ray is not particularly limited as long as it can provide energy to proceed the polymerization reaction of the polymerizable compound in the liquid composition. For example, ultraviolet rays, electron beams, α rays, β-rays, γ-rays, and X-rays can be used. Of these, ultraviolet rays are preferable. A particularly high energy light source obviates the need for a polymerization initiator to proceed polymerization reaction.

The polymerizable compound preferably has at least one radical polymerizable functional group. Examples include, but are not limited to, monofunctional, bifunctional, trifunctional or higher radical polymerizable compounds, functional monomers, and radical polymerizable oligomers. Of these, a bifunctional or higher radical polymerizable compound is preferred.

Specific examples of the monofunctional radical polymerizable compound include, but are not limited to, 2-(2-ethoxyethoxy)ethyl acrylate, methoxypolyethylene glycol monoacrylate, methoxypolyethylene glycol monomethacrylate, phenoxypolyethylene glycol acrylate, 2-acryloyloxyethyl succinate, 2-ethylhexyl acrylate, 2-hydroxyethyl acrylate, 2-hydroxypropyl acrylate, tetrahydrofurfuryl acrylate, 2-ethylhexyl carbitol acrylate, 3-methoxybutyl acrylate, benzyl acrylate, cyclohexyl acrylate, isoamyl acrylate, isobutyl acrylate, methoxytriethylene glycol acrylate, phenoxytetraethylene glycol acrylate, cetyl acrylate, isostearyl acrylate, stearyl acrylate, and styrene monomers. These can be used alone or in combination.

Specific examples of the bifunctional radical polymerizable compound include, but are not limited to, 1,3-butane diol acrylate, 1,4-butane diol acrylate, 1,4-butane diol dimethacrylate, 1,6-hexane diol diacrylate, 1,6-hexane diol dimethaacrylate, diethylene glycol diacrylate, polyethylene glycol diacrylate, neopentyl glycol diacrylate, bisphenol A EO-modified diacrylate, bisphenol F EO-modified diacrylate, neopentyl glycol diacrylate, and tricyclodecane dimethanol diacrylate. These can be used alone or in combination.

Specific examples of the tri- or higher radical polymerizable compound include, but are not limited to, trimethylol propane triacrylate (TMPTA), trimethylol propane trimethacrylate, EO-modified trimethylol propane triacrylate, PO-modified trimethylol propane triacrylate, caprolactone-modified trimethylol propane triacrylate, HPA-modified trimethylol propane triacrylate, pentaerythritol triacrylate, pentaerythritol tetra acrylate (PETTA), glycerol triacrylate, ECH-modified glycerol triacrylate, EO-modified glycerol triacrylate, PO-modified glycerol triacrylate, tris(acryloxyrthyl)isocyanulate, dipenta erythritol hexacrylate (DPHA), caprolactone-modified dipenta erythritol hexacrylate, dipenta erythritol hydroxyl dipenta acrylate, alkylized dipenta erythritol tetracrylate, alkylized dipenta erythritol triacrylate, dimethylol propane tetracrylate (DTMPTA), penta erythritol ethoxy tetracrylate, EO-modified phosphoric acid triacrylate, and 2,2,5,5-tetrahydroxy methyl cyclopentanone tetracrylate. These can be used alone or in combination.

The proportion of the polymerizable compound in the liquid composition is preferably from 5.0 to 70.0 percent by mass, more preferably from 10.0 to 50.0 percent by mass, and furthermore preferably from 20.0 to 40.0 percent by mass. When the proportion of the polymerizable compound is 70.0 percent by mass or less, the pore size of the obtained porous medium is a few nm or less, which is not too small, the porous medium has an appropriate porosity so that it is possible to reduce the tendency to make it difficult for liquid or air to permeate the porous medium, which is preferable. In addition, when the proportion of the polymerizable compound is 5.0 percent by mass or more, a three-dimensional network structure of the resin is sufficiently formed to obtain a sufficient porous structure, and the strength of the obtained porous structure is enhanced. This is preferable.

Solvent

The solvent (hereinafter also referred to as "porogen" in the following description) is compatible with the polymerizable compound. The solvent is a liquid that becomes incompatible (meaning causing phase separation) with the polymer (resin) in the process of polymerization of the polymerizable compound in the liquid composition. When the solvent is contained in the liquid composition, the polymerizable compound forms a porous resin at the polymerization in the liquid composition. Moreover, it is preferable to dissolve a compound (polymerization initiator described later) that produces a radical or an acid by light or heat. These can be used alone or in combination. In this embodiment, the solvent is not polymerizable.

The boiling point of the porogen alone or in combination of two or more is preferably from 50 to 250 degrees C. and more preferably from 70 to 200 degrees C. at normal pressure. When the boiling point is 50 degrees C. or higher, vaporization of the porogen around the room temperature is reduced so that, the liquid composition is easily handled and the control of the proportion of the porogen in the liquid composition becomes easy. Moreover, when the boiling point is 250 degrees C. or lower, the time taken to dry the porogen after the polymerization is shortened and the productivity of the porous resin is improved. In addition, since the proportion of the porogen remaining inside the porous resin can be reduced, the porous resin can be used as a functional layer such as a substance separation layer for separating substances and a reaction layer as a reaction field, which enhances quality.

Moreover, it is preferable that the boiling point as one type of porogen or the boiling point when using two or more types together be 120 degrees C. or higher at a normal pressure.

Specific examples of the porogen include, but are not limited to, ethylene glycols such as diethylene glycol monomethyl ether, ethylene glycol monobutyl ether, ethylene glycol monoisopropyl ether, and dipropylene glycol monomethyl ether, esters such as γ-butyrolactone and propylene carbonate, and an amide such as NN dimethylacetamide. In addition, other examples include liquids having a relatively large molecular weight such as methyl tetradecanoate, methyl decanoate, methyl myristate, and tetradecane. Further, liquids such as acetone, 2-Ethylhexanol, and 1-bromonaphthalene can also be mentioned.

In the present embodiment, the liquid specified above is not always a porogen. The porogen in the present embodiment is compatible with the polymerizable compound as described above and becomes incompatible (i.e., causing phase separation) with the polymer (resin) in the course of polymerization of the polymerizable compound in the liquid composition. In other words, whether a liquid is a porogen depends on the relationship between a polymerizable compound and the polymer (resin formed by polymerization of the polymerizable compound).

In addition, since the liquid composition of the present embodiment only needs to contain at least one porogen having this specific relationship with a polymerizable compound, the latitude of material selection at the time of preparing the liquid composition is large, which makes the design of the liquid composition easy. Due to the high level of latitude of material selection at the time of preparation of a liquid composition, a variety of properties for the liquid composition other than the formation of a porous structure can be handled. For example, when a liquid composition is discharged by an inkjet method, the liquid composition is required to have discharging stability. However, the liquid composition is easily designed because the material can be selected from a wide range.

In addition, as long as the liquid composition of this embodiment contains at least one type of porogen having the specific relationship mentioned above with the polymerizable compound, a liquid not having this specific relationship (liquid that is not porogen) may be added. However, the proportion of the liquid not having this specific relationship (liquid that is not a porogen) with the polymerizable compound is preferably 10.0 percent by mass or less, 5.0 percent by mass or less, and furthermore preferably 1.0 percent by mass or less to the total amount of the liquid composition.

The proportion of the porogen in the liquid composition is preferably from 30.0 to 95.0 percent by mass, more preferably from 50.0 to 90.0 percent by mass, and furthermore preferably from 60.0 to 80.0 percent by mass. When the proportion of the porogen is 30.0 percent by mass or more, the pore size of the obtained porous medium is a few nm or less, which is not too small, the porous medium has an appropriate porosity so that it is possible to reduce the tendency to make it difficult for liquid or air to permeate the porous medium, which is preferable. In addition, when the proportion of the porogen is 95.0 percent by mass or less, a three-dimensional network structure of the resin is sufficiently formed to obtain a sufficient porous structure, and the strength of the obtained porous structure is enhanced, which is preferable.

The mass ratio of the polymerizable compound to the porogen in the liquid composition is preferably from 1.0:0.4 to 1.0:19.0, more preferably from 1.0:1.0 to 1.0:9.0, and furthermore preferably from 1.0:1.5 to 1.0:40.

Polymerization-Induced Phase Separation

In this embodiment, a porous resin is formed by polymerization-induced phase separation. In the polymerization-induced phase separation in this embodiment, the polymerizable compound and the porogen are compatible, however, the polymer (resin) produced in the process of polymerization of the polymerizable compound and the porogen are incompatible with each other (phase separation occurs). Although there are other methods for obtaining a porous medium by phase separation, a porous medium having a network structure can be formed by using the polymerization-induced phase separation method, so that the obtained porous medium is expected to have highly chemical resistance and heat resistance. Further, as compared with other methods, there are also advantages such as a short process time and easy surface modification.

Next, a process for forming a porous resin using polymerization-induced phase separation will be described. A polymerizable compound causes polymerization reaction by light irradiation, etc., to form a resin. During this process, solubility of the growing resin in the porogen decreases. As a consequence, phase separation occurs between the resin and the porogen. Finally, the resin forms a porous structure having a network structure having a porous structure in which the pores are filled with the porogen, etc. When this is dried, the porogen, etc., are removed and the porous resin remains. Therefore, in order to form a porous resin having an appropriate porosity, the compatibility between the porogen and the polymerizable compound and the compatibility between the porogen and the resin formed by polymerizing the polymerizable compound are investigated.

Hansen Solubility Parameter (HSP)

The compatibility described above can be predicted through the Hansen solubility parameter (HSP). The Hansen Solubility Parameter (HSP) is a useful tool for predicting the compatibility of two substances, a parameter discovered by Charles M. Hansen. Hansen Solubility Parameter (HSP) is represented by combining the following experimentally and theoretically derived three parameters ($\delta D$, $\delta P$, and $\delta H$). Hansen solubility parameter (HSP) is represented in $MPa^{0.5}$ or $(J/cm^3)^{0.5}$. In this embodiment $(J/cm^3)^{0.5}$ is employed.

$\delta D$: Energy derived from London dispersion force
$\delta P$: Energy derived from dipole interaction
$\delta H$: Energy derived from hydrogen bonding force The Hansen solubility parameter (HSP) is a vector quantity represented as ($\delta D$, $\delta P$, $\delta H$), and represented by plotting on a three-dimensional space (Hansen space) having these three parameters as coordinate axes. For the Hansen solubility parameters (HSP) of commonly used substances, there is a known information source such as a database. Therefore, for example, the Hansen solubility parameter (HSP) of a substance is obtained by referring to the database. Regarding a substance whose Hansen Solubility Parameters (HSP) is not registered in the database, it can be calculated from the chemical structure of the substance and Hansen Solubility Sphere Method described later using computer software such as Hansen Solubility Parameters in Practice (HSPiP). The Hansen solubility parameter (HSP) of a mixture containing two or more substances is calculated as a vector sum of values obtained by multiplying the Hansen solubility parameter (HSP) of each substance by the volume ratio of each substance to the entire mixture. In the present embodiment, the Hansen solubility parameter (HSP) of the solvent (porogen) obtained based on a known information source such as a database is referred to as "Hansen solubility parameter of solvent".

Also, the relative energy difference (RED) based on the Hansen solubility parameter (HSP) of a solute and the Hansen solubility parameter (HSP) of a solution is represented by the following mathematic expression.

Relative energy difference (RED)=Ra/Ro

In the mathematic expression, Ra represents the HSP distance between the Hansen solubility parameter (HSP) of a solute and the Hansen solubility parameter (HSP) of a solution, and Ro represents the interaction radius of the solute. The HSP distance (Ra) between the Hansen Solubility Parameters (HSP) indicates the distance between the two substances. A smaller value means that two types of substances are closer to each other in the three-dimensional space (Hansen space) and indicates that the possibility of mutual dissolution (compatibility) increases.

Assuming that the respective Hansen solubility parameters (HSP) for the two substances (solute A and solution B) are as follows, Ra can be calculated as follows:

$$HSP^A=(\delta D^A, \delta P^A, \delta H^A)$$

$$HSP^B=(\delta D^B, \delta P^B, \delta H^B)$$

$$Ra=[4\times(\delta D^A-\delta D^B)^2+(\delta P^A-\delta P^B)^2+(\delta H^A-\delta H^B)^2]^{1/2}$$

Ro (interaction radius of solute) can be determined by, for example, the Hansen solubility sphere method described below.

Hansen Solubility Sphere Method

First, a substance whose Ro is required and several dozens of solvents for evaluation having known Hansen solubility parameters (HSP) (liquids which are different from the above-mentioned "solvent (porogen)") are prepared and subjected to a compatibility test of the substance to each of the solvents for evaluation. In the compatibility test, the Hansen solubility parameter (HSP) of the solvents for evaluation demonstrating compatibility and the Hansen solubility parameter (HSP) of the solvents for evaluation not demonstrating compatibility are plotted in the Hansen space. Based on the Hansen solubility parameter (HSP) of each of the plotted solvents for evaluation, a virtual sphere (Hansen sphere) is created including the Hansen solubility parameters (HSP) of the solvent group for evaluation demonstrating compatibility while excluding the Hansen solubility parameters of the solvent group for evaluation not demonstrating compatibility. The radius of the Hansen sphere is the interaction radius Ro of the substance and the center is the Hansen solubility parameter (HSP) of the substance. Note that an evaluator himself sets the evaluation criteria (whether or not the subject is compatible) for compatibility between a substance to obtain the interaction radius Ro and Hansen solubility parameter (HSP) and a solvent for evaluation whose Hansen solubility parameter (HSP) is known. The evaluation criteria in this embodiment will be described later.

Hansen Solubility Parameter (HSP) and Interaction Radius of Polymerizable Compound Hansen solubility parameter (HSP) of the polymerizable compound in this embodiment and the interaction radius of the polymerizable compound are determined by the Hansen solubility sphere method. As described above, the evaluation criteria for compatibility in the Hansen solubility sphere method are set by the evaluator himself. Therefore, the Hansen solubility parameter (HSP) of the polymerizable compound in the present embodiment obtained by the following criteria is referred to as Hansen solubility parameter C of the polymerizable compound and the interaction radius of the polymerizable compound is represented as interaction radius D of the polymerizable compound. In other words, unlike the Hansen solubility parameter (HSP) of the solvent obtained based on a known data sources such as database, the Hansen solubility parameter C of the polymerizable compound and the interaction radius D of the polymerizable compound are obtained based on the Hansen solubility sphere method including the evaluation criteria of compatibility set by the evaluator himself.

According to the following [1-1] and [1-2], the Hansen solubility parameter C of a polymerizable compound and the interaction radius D of the polymerizable compound are obtained by the evaluation of compatibility between the polymerizable compound and a solvent for evaluation, which is based on light transmission of the composition for measuring transmission measured at a wavelength of 550 nm while stirring a composition for measuring transmission containing the polymerizable compound and the solvent for evaluation.

[1-1] Preparation of Composition for Measuring Transmission

First, a polymerizable compound whose Hansen solubility parameter (HSP) is desired and several dozen types of solvents for evaluation with known Hansen solubility parameters (HSP) are prepared and the polymerizable compound, each solvent for evaluation, and a polymerization initiator are mixed with the following ratio to prepare the composition for measuring transmission. Dozens of solvents for evaluation with known Hansen solubility parameters (HSP) are 21 types of solvents for evaluation below.

Ratio of Composition for Measuring Transmission

Polymerizable compound whose Hansen solubility parameter (HSP) is desired: 28.0 percent by mass Solvent for evaluation with known Hansen solubility parameter (HSP): 70.0 percent by mass Polymerization initiator (Irgacure 819, manufactured by BASF SE): 2.0 percent by mass Solvent Group (21 types) for Evaluation Ethanol, 2-propanol, mesitylene, dipropylene glycol monomethyl ether, N-methyl 2-pyrrolidone, γ-butyrolactone, propylene glycol monomethyl ether, propylene carbonate, ethyl acetate, tetrahydrofuran, acetone, n-tetradecane, ethylene glycol, diethylene glycol monobutyl ether, diethylene glycol butyl ether acetate, methyl ethyl ketone, methyl isobutyl ketone, 2-ethylhexanol, diisobutyl ketone, benzyl alcohol, and 1-bromonaphthalene

[1-2] Measurement of Light Transmission

The prepared composition for measuring transmission is infused into a quartz cell and the transmission of light (visible light) having a wavelength of 550 nm of the composition for measuring transmission is measured while stirring at 300 rpm using a stir bar. In this embodiment, when the light transmission is 30 percent or more, the polymerizable compound and the solvent for evaluation are determined as a compatible state. When the light transmission is less than 30 percent, the polymerizable compound and the solvent for evaluation are determined as incompatible. Various conditions regarding the measurement of light transmission are as follows:

Quartz cell: Special micro cell with screw cap (trade name: M25-UV-2)
Transmission measuring device: USB4000, manufactured by Ocean Optics, Inc
Rate of stirring: 300 rpm
Measuring wavelength: 550 nm
Reference: Measures light transmission at a wavelength of 550 nm with the quartz cell filled with air (transmission: 100 percent)

Another example of the present embodiment in which the polymerizable compound and the solvent (porogen) contained in the liquid composition (distinguished from the above-described composition for measuring transmission) are compatible is as follows. That is, the light transmission is measured using the liquid composition instead of the composition for measuring transmission in the [1-2] without executing the [1-1]. At the time, when the light transmission is 30 percent or more, it is determined that the polymerizable compound and the solvent (porogen) contained in the liquid composition are compatible. When the light transmission is less than 30 percent or more, it is determined as incompatible. In the present embodiment, the light transmission measured using the liquid composition instead of the composition for measuring transmission in [1-2] is referred to as the light transmission of the liquid composition measured at a wavelength of 550 nm during stirring the liquid composition.

Hansen Solubility Parameter (HSP) and Interaction Radius of Resin Formed by Polymerization of Polymerizable Compound Hansen solubility parameter (HSP) of the resin formed by the polymerization of the polymerizable compound in the present embodiment and the interaction radius of the resin formed by the polymerization of the polymerizable compound are determined by the Hansen solubility sphere method. As described above, the evaluation criteria for compatibility in the Hansen solubility sphere method are set by the evaluator himself. Therefore, the Hansen solubility parameter (HSP) of the resin formed by the polymerization of the polymerizable compound in the present embodiment according to the following criteria is represented as Hansen solubility parameter A of the resin and the interaction radius of the resin formed by the polymerization of the polymerizable compound is represented as the interaction radius B of the resin. In other words, unlike the Hansen solubility parameter (HSP) of the solvent obtained based on a known data sources such as database, the Hansen solubility parameter A of the resin and the interaction radius B of the resin are obtained based on the Hansen solubility sphere method including the evaluation criteria of compatibility set by the evaluator himself.

The Hansen solubility parameter A of the resin and the interaction radius B of the resin are obtained by evaluating the compatibility of the resin with the solvent for evaluation according to the following [2-1], [2-2] and [2-3], which is based on the increasing ratio of haze (cloudiness) value in an element for measuring haze prepared using a polymerizable compound and a composition for measuring haze containing a solvent for evaluation.

[2-1] Preparation of Composition for Measuring Transmission

First, a precursor (polymerizable compound) of a resin whose Hansen solubility parameter (HSP) is desired and several dozen types of solvents for evaluation with known Hansen solubility parameters (HSP) are prepared. Thereafter, the polymerizable compound, each solvent for evaluation, and a polymerization initiator are mixed with the following ratio to prepare the composition for measuring haze. Dozens of solvents for evaluation with known Hansen solubility parameters (HSP) are 21 types of solvents for evaluation below.

Ratio of Composition for Measuring Haze
Precursor (polymerizable compound) of resin whose Hansen solubility parameter (HSP) is desired: 28.0 percent by mass
Solvent for evaluation with known Hansen solubility parameter (HSP): 70.0 percent by mass
Polymerization initiator (Irgacure 819, manufactured by BASF SE): 2.0 percent by mass
Solvent Group (21 Types) for Evaluation
Ethanol, 2-propanol, mesitylene, dipropylene glycol monomethyl ether, N-methyl 2-pyrrolidone, γ-butyrolactone, propylene glycol monomethyl ether, propylene carbonate, ethyl acetate, tetrahydrofuran, acetone, n-tetradecane, ethylene glycol, diethylene glycol monobutyl ether, diethylene glycol butyl ether acetate, methyl ethyl ketone, methyl isobutyl ketone, 2-ethylhexanol, diisobutyl ketone, benzyl alcohol, and 1-bromonaphthalene

[2-2] Preparation of Element for Measuring Haze

Resin particulates are uniformly dispersed on an alkali-free glass substrate by spin coating to obtain a gap agent. Subsequently, the substrate coated with the gap agent and an alkali-free glass substrate to which no gap agent is applied are attached to each other in such a manner that the gap agent is sandwiched between the substrate and the alkali-free glass substrate. Next, the composition for measuring haze prepared in [2-1] is filled into between the attached substrates utilizing the capillary phenomenon to produce an element for measuring haze before UV irradiation. Subsequently, the element for measuring haze before UV irradiation is irradiated with UV to cause the composition for measuring haze to cure. Finally, the periphery of the substrate is sealed with a sealant to prepare the element for measuring haze. Various conditions at the time of preparation are as follows.

Alkali-free glass substrate: OA-10G, 40 mm, t=0.7 mm, manufactured by Nippon Electric Glass Co., Ltd.
Gap agent: Resin fine particles Micropearl GS-L100, average particle size 100 manufactured by SEKISUI CHEMICAL CO., LTD.
Spin coating conditions: Amount of dispersing droplet 150 μL, rate of rotation 1,000 rpm, time of rotation 30 s
Amount of filled composition for measuring haze: 160 μL
UV irradiation conditions: UV-LED is used as a light source, light source wavelength 365 nm, irradiation intensity 30 mW/cm$^2$, time of irradiation 20 seconds
Sealant: TB3035B (manufactured by ThreeBond Co., Ltd.)

[2-3] Measurement of Haze Value (Cloudiness)

The haze value (cloudiness) is measured using the prepared element for measuring haze before UV irradiation and the element for measuring haze. Using the measurement value for the element for measuring haze before UV irradiation as a reference (haze value 0), the increasing ratio of the measurement value (haze value) for the element for measuring haze to the measurement value (haze value) for the element for measuring haze before UV irradiation is calculated. The haze value in the element for measuring haze increases as the compatibility between the resin formed by polymerization of the polymerizable compound and the solvent for evaluation decreases and the haze value decreases as the compatibility increases. Moreover, as the haze value increases, the resin formed by polymerization of polymerizable compound tends to form a porous structure. In this embodiment, when the increase ratio of the haze value is 1.0 percent or more, the resin and the solvent for evaluation are determined as incompatible. When the increase ratio is less than 1.0 percent, the resin and the solvent for evaluation are determined as compatible. The instruments used for the measurement are as follows.

Haze measuring device: Haze meter NDH5000, manufactured by Nippon Denshoku Industries Co., Ltd.

Another example of the present embodiment in which the polymerizable compound and the solvent (porogen) contained in the liquid composition (distinguished from the composition for measuring haze mentioned above) are incompatible (phase separation occurs) is as follows. First, in the [2-2] executed without executing the [2-1], the liquid composition is used instead of the composition for measuring haze to prepare an element for measuring haze before UV irradiation and an element for measuring haze. Next, the increase ratio of the haze value is measured using the element for measuring haze before UV irradiation and the element for measuring haze using the liquid composition in the [2-3]. At the time, when the increase ratio of the haze value is 1.0 percent or more, the polymer (resin) and the solvent (porogen) contained in the liquid composition are determined as incompatible. I.e., phase separation occurs. When the increase ratio is less than 1.0 percent, it is determined as compatible, i.e., phase separation does not occur. In the present embodiment, the element for measuring haze prepared using the liquid composition instead of the composition for measuring haze in the [2-2] is referred to as the element for measuring haze prepared using the liquid composition.

Relative Energy Difference (RED) 1 Based on Hansen Solubility Parameter (HSP) of Resin and Solvent (Porogen)

The relative energy difference (RED) 1, based on a Hansen solubility parameter (HSP) A of a resin formed by polymerizing the polymerizable compound, an interaction diameter B of the resin, and an HSP of the solvent, is 1.00 or greater, wherein RED 1={Distance between (the HSP A of the resin) and (the HSP of the solvent)}/(the interaction diameter B of the resin) Relationship 1. RED 1 is more preferably 1.10 or greater, furthermore preferably 1.20 or greater, and particularly preferably 1.30 or greater.

When RED 1 based on the Hansen solubility parameter (HSP) of the resin and the porogen is 1.00 or greater, the resin formed by polymerization of the polymerizable compound in the liquid composition and the porogen are likely to cause phase separation and a porous resin is easily formed, which is preferable.

Relative Energy Difference (RED) 2 Based on Hansen Solubility Parameter (HSP) of Polymerizable Compound and Solvent (Porogen)

As described above, the relative energy difference (RED) 2, based on the Hansen solubility parameter (HSP) C of the polymerizable compound determined based on the light transmission at a wavelength of 550 nm of the composition for measuring transmission measured when stirring the composition for measuring transmission containing the polymerizable compound and the solvent for evaluation, the interaction radius D of the polymerizable compound determined based on the compatibility of the polymerizable compound and the solvent for evaluation, and the Hansen solubility parameter of the solvent, is preferably 1.05 or less, more preferably 0.90 or less, furthermore preferably 0.80 or less, and preferably 0.70 or less. RED 2={Distance between (the HSP C of the polymerizable compound) and (the HSP of the solvent)}/(the interaction diameter D of the polymerizable compound) Relationship 2

When RED 2 based on the Hansen solubility parameter (HSP) of the polymerizable compound and the porogen is 1.05 or less, the polymerizable compound and the porogen tend to be compatible. As the RED 2 approaches zero, the both become more compatible. For this reason, when the RED 2 is 1.05 or less, a liquid composition is obtained which demonstrates a high level of solution stability in which the polymerizable compound does not precipitate over time after the polymerizable compound is dissolved in the porogen. Since the polymerizable compound has a high level of solubility in the porogen, discharging stability of the liquid composition can be maintained. For example, the liquid composition of the present embodiment can be applied to the method of discharging the liquid composition such as the inkjet method. Also, when the RED 2 is 1.05 or less, separation between the polymerizable compound and the porogen in the state of the liquid composition before the polymerization reaction starts is reduced so that irregular or nonuniform porous resin is not easily formed.

Polymerization Initiator

The polymerization initiator can produce active species such as a radical or a cation upon application of energy such as light and heat and initiates polymerization of a polymerizable compound. It is suitable to use a known radical polymerization initiator, a cation polymerization initiator, a base producing agent, or a combination thereof. Of these, photoradical polymerization initiators are preferable.

Photoradical producing agents can be used as the photoradical polymerization initiator. For example, photoradical polymerization initiators such as Michler's ketone and benzophenone known by the trade name of Irgacure® and Darocur® are usable.

Specific examples include, but are not limited to, benzophenone and acetophenone derivatives such as α-hydroxy- or α-aminocetophenone, 4-aroyl-1,3-dioxolane, benzyl ketal, 2,2-diethoxyacetophenone, p-dimethyl. aminoacetophene, p-dimethylamino propiophenone, benzophenone, 2-chlorobenzophenone, pp'-dichlorobenzophene, pp'-bisdiethylamino benzophenone, Michler's ketone, benzyl, benzoin, benzyldimethyl ketal, tetramethylthiuram monosulfide, thioxanthone, 2-chlorothioxanthone, 2-methylthioxanthone, azobisisobutyronitrile, benzoin peroxide, di-tert-butyl peroxide, 1-hydroxy cyclohexyl phenyl ketone, 2-hydroxy-2-methyl-1-phenyl-1-one, 1-(4-isopropylphenyl)-2-hydroxy-2-methylpropan-1-one, methylbenzoyl formate, benzoin isopropyl ether, benzoin methyl ether, benzoin ethyl ether, benzoin ether, benzoin isobutyl ether, benzoin n-butyl ether, and benzoin n-propyl, 1-hydroxycyclohexyl-phenyl-ketone, 2-benzyl-2-dimethylamino-1-(4-morpholinophenyl)-butanone-1, 1-hydroxy-cyclohexyl-phenyl-ketone, 2,2-dimethoxy-1,2-diphenylethane-1-one, bis(η5-2,4-cyclopentadien-1-yl)-bis(2,6-difluoro-3-(1H-pyrrol-1-yl)-phenyl)titanium, bis(2,4,6-trimethylbenzoyl)-phenyl phosphine oxide, 2-methyl-1-[4-(methylthio)phenyl]-2-morpholinopropan-1-one, 2-hydroxy-2-methyl-1-phenyl-propane-1-one (Darocur 1173), bis(2,6-dimethoxybenzoyl)-2,4,4-trimethyl-pentylphosphine oxide, 1-[4-(2-hydroxyethoxy)-phenyl]-2-hydroxy-2-methyl-1- propan-1-one-monoacylphosphine oxide, bisacylphosphine oxide or titanocene, fluorescene, anthraquinone, thioxanthone or xanthone, lophine dimer, trihalomethyl compound or dihalomethyl compound, active ester compound, and organoboron compound.

Furthermore, a photocrosslinking radical producing agent such as a bisazide compound may be contained at the same time. When polymerizing only with heat, a thermal polymerization initiator such as azobisisobutyronitrile (AIBN) which is a normal radical producing agent can be used.

In order to obtain a sufficient curing speed, the proportion of the polymerization initiator is preferably from 0.05 to 10.0 percent by mass and more preferably from 0.5 to 5.0 percent by mass to the total mass (100.0 percent) of the polymerizable compound.

Method of Manufacturing Liquid Composition

It is preferable to manufacture the liquid composition by dissolving a polymerization initiator in a polymerization compound, further dissolving a porogen or other components in the polymerizable compound, and stirring the solution to obtain a uniform solution.

Properties of Liquid Composition

Viscosity of the liquid composition is preferably from 1.0 to 150.0 mPa·s and more preferably from 1.0 to 30.0 mPa·s, and particularly preferably from 1.0 to 25.0 mPa·s at 25 degrees C. in terms of workability when applying the liquid composition. When viscosity of the liquid composition is from 1.0 to 30.0 mPa·s, good dischargeability can be maintained even when the liquid composition is applied to an inkjet method. Viscosity can be measured by, for example, a viscometer (RE-550L, manufactured by TOKI SANGYO CO., LTD.).

Device for Manufacturing Porous Resin and Method of Manufacturing Porous Resin

FIG. 1 is a schematic diagram illustrating an example of the device for manufacturing a porous resin that executes the method of manufacturing a porous resin of the present embodiment.

Device for Manufacturing Porous Resin

A device 100 for manufacturing a porous resin manufactures a porous resin using the liquid composition mentioned above. The device 100 for manufacturing a porous resin includes a print processing unit 1 that executes applying a liquid composition 7 onto a print substrate 4 to form a liquid composition layer thereon, a polymerization processing unit 2 that executes activating a polymerization initiator in the liquid composition layer to start polymerization of the polymerization compound to obtain a porous resin precursor 6, and a heating unit 3 that executes heating the porous resin precursor 6 to obtain a porous resin. The device 100 for manufacturing a porous resin further includes a conveyor unit 5 that conveys the print substrate 4. The conveyor unit 5 conveys the print substrate 4 in the sequence of the print processing unit 1, a polymerization processing unit 2, and a heating unit 3 at a preset speed.

Print Processing Unit

The printing process unit 10 includes a print device 1a as an example of the application device that executes the application of the liquid composition 7 onto the print substrate 4, a storage container 1b that contains the liquid composition 7, and a supply tube 1c that supplies the liquid composition 7 stored in the storage container 1b to the print device 1a.

The storage container 1b accommodates the liquid composition 7. The print processing unit 1 discharges the liquid composition 7 from the print device 1a to apply the liquid composition 7 onto the print substrate 4 to form the liquid composition layer in a thin film like manner. The storage container 1b may be configured integrated with the device 100 for manufacturing a porous resin. Alternatively, it can be configured removable from the device 100 for manufacturing a porous resin. In addition, the storage container 1b may be configured to add the liquid composition 7 to the container 1b integrated with the device 100 for manufacturing a porous resin or the container 1b detachable from the device 100 for manufacturing a porous resin.

The print device 1a is not particularly limited as long as it can apply the liquid composition 7. For example, any printing device can be used that can execute the spin coating method, the casting method, the micro gravure coating method, the gravure coating method, the bar coating method, the roll coating method, the wire bar coating method, the dip coating method, the slit coating method, the capillary coating method, the spray coating method, the nozzle coating method, the gravure printing method, the screen printing method, the flexographic printing method, the offset printing method, the reverse printing method, the inkjet printing method, etc.

The storage container 1b and the supply tube 1c can be arbitrarily selected as long as the liquid composition 7 can be stably stored and supplied. The material constituting the storage container 1b and the supply tube 1c preferably has a light shielding property in a relatively short wavelength range of ultraviolet and visible light. Due to this light shielding property, the liquid composition 7 is prevented from starting being polymerized by external light.

Polymerization Processing Unit

As illustrated in FIG. 1, the polymerization processing unit 2 includes a light irradiation device 2a, which is an example of a curing device that executes a curing process for causing the liquid composition 7 to cure upon irradiation of active energy rays such as heat and light and a polymerization inert gas circulating device 2b that circulates a polymerization inert gas. The light irradiation device 2a irradiates the liquid composition layer formed by the printing processing unit 10 with light in the presence of a polymerization inert gas to proceed photopolymerization to obtain the porous resin precursor 6.

The light irradiation device 2a is appropriately selected depending on the absorption wavelength of the photopolymerization initiator contained in the liquid composition layer and is not particularly limited as long as it can start and proceed the polymerization of the compound in the liquid composition layer. For example, ultraviolet light sources such as a high-pressure mercury lamp, a metal halide lamp, a hot cathode tube, a cold cathode tube, and an LED can be used. However, since light having a shorter wavelength generally tends to reach a deep part, it is preferable to select a light source according to the thickness of the porous film to be formed.

Next, regarding the irradiation intensity of the light source of the light irradiation device 2a, if the irradiation intensity is too strong, the polymerization proceeds rapidly before the phase separation sufficiently occurs, so that a porous structure tends to be difficult to obtain. In addition, when the irradiation intensity is too weak, the phase separation proceeds more than the microscale and the porous variation and the coarsening are likely to occur. In addition, the irradiation time becomes longer and the productivity tends to decline. Therefore, the irradiation intensity is preferably 10 mW/cm$^2$ to 1 W/cm$^2$ and more preferably from 30 to 300 mW/cm$^2$.

Next, the polymerization inert gas circulation device 2b plays a role of reducing the polymerization active oxygen concentration contained in the atmosphere and allowing the polymerization reaction of the polymerizable compound near the surface of the liquid composition layer to proceed without inhibition. Therefore, the polymerization inert gas used is not particularly limited as long as it satisfies the function mentioned above. For example, nitrogen, carbon dioxide, and argon can be used.

Moreover, regarding the flow rate, in terms of the inhibition reduction, $O_2$ concentration is preferably less than 20 percent (environment in which $O_2$ concentration is lower than atmosphere), more preferably from 0 to 15 percent, and furthermore preferably from 0 to 5 percent. Further, it is preferable that the polymerization inert gas circulation device 2b include a temperature control device in order to stably proceed polymerization.

Heating Unit

As illustrated in FIG. 1, a heating unit 3 includes a heating device 3a and heats a solvent remaining in the porous resin precursor 6 formed by the polymerization processing unit 2 to dry and remove it. Thereby, a porous resin can be formed. The heating unit 3 may remove the solvent under a reduced pressure.

In addition, the heating unit 3 heats the porous film precursor 6 with the heating device 3a to promote the polymerization reaction in the polymerization processing unit 2 and dry and remove the photopolymerization initiator remaining in the porous film precursor 6. Note that it is not always necessary to promote the polymerization and remove the initiator simultaneously. The polymerization can be conducted before or after the solvent is removed.

Furthermore, the heating unit 330 heats the porous medium under a reduced pressure to complete the polymerization after the solvent is removed. The heating device 3a is not particularly limited as long as it satisfies the function described above. Examples include, but are not limited to, an IR heater and a hot air heater.

Further, the heating temperature and the time can be appropriately selected according to the boiling point of the solvent contained in the porous film precursor 6 and the formed film thickness.

Print Substrate

As the material of the print substrate 4, any material can be used regardless of whether it is transparent or opaque. That is, as a transparent substrate, a glass substrate, a resin film substrate such as various plastic films, or a composite substrate thereof can be used. As an opaque substrate, a silicon substrate, a metal substrate such as stainless steel, or a laminate of these substrates can be used.

The print substrate 4 includes, but are not limited to, a recording medium such as plain paper, gloss paper, special paper, and cloth. Further, the recording medium may be a low-permeable substrate (low-absorptive substrate). The low-permeable substrate has a surface with low moisture permeability, absorbency, and/or adsorption property and includes a material having myriad of hollow spaces inside but not open to the exterior. Examples of the low-permeable substrate are coated paper for use in commercial printing and a recording medium like coated paper board having a middle layer and a back layer mixed with waste paper pulp.

The print substrate 4 may be a porous resin sheet used as an insulating layer for a power storage element or a power generation element.

Moreover, the print substrate 4 having a curved surface or a rough form can be used as long as it is applicable to the printing processing unit 10 and the polymerization processing unit 2.

Porous Resin

The film thickness of the porous resin formed of the liquid composition is not particularly limited. For example, in terms of curing uniformity during polymerization, it is preferably from 0.01 to 500 µm, more preferably from 0.01 to 100 µm, furthermore preferably from 1 to 50 µm, and particularly preferably from 10 to 20 µm. When the film thickness is 0.01 µm or more, the surface area of the obtained porous resin is increased and the function of the porous resin can be sufficiently demonstrated. Moreover, when the film thickness is 500 µm or less, unevenness of light and heat used during polymerization in the film thickness direction is reduced and a uniform porous resin can be obtained in the film thickness direction. This uniform porous resin in the film thickness direction reduces structural unevenness of the porous resin and decreases deterioration of property of allowing liquid or gas to pass through. In addition, the film thickness of a porous resin is suitably adjusted according to the application of the porous resin. For example, when a porous resin is used as the insulating layer for a power storage element, it is preferably from 10 to 20 µm.

The formed porous resin is not particularly limited. For example, in terms of securing good permeability of liquid and gas, the porous resin preferably has a three-dimensional branched network structure of a cured resin as a skeleton and a co-continuous structure (also referred to as a monolith structure having multiple continuously connected pores. That is, it is preferable that the porous resin have a large number of pores and each pore thereof are communicated with ambient pores expanding in three-dimensional directions. These pores communicating with each other secure permeation of liquid and gas and helps to efficiently demonstrate substance separation and reaction field.

One of the properties inherent to such a monolith structure is air permeability. The air permeability of the porous resin is measured according to, for example, JIS P8117 format and preferably 500 seconds/100 mL or less and more preferably 300 seconds/100 mL or less. At the time, the air permeability is measured using, for example, a Gurley type densometer (manufactured by TOYO SEIKI KOGYO CO. LTD.).

The cross-section of the pore of the formed porous resin may take various sizes and forms such as a substantially circular form, a substantially elliptical form, and a substantially polygonal form. The size of the pore refers to the length of the longest portion in the cross-section. The size of the pore can be determined from a cross-section photograph taken by a scanning electron microscope (SEM). The size of the pores of the porous resin is not particularly limited. For example, it is preferably from 0.01 to 10 µm in terms of permeability of liquid and gas. The porosity of the porous resin is preferably from 30 percent or more and more preferably 50 percent or more. The method of controlling the size of the pore and the porosity of the porous resin within these ranges is not particularly limited. Examples include, but are not limited to, a method of controlling the proportion of the polymerizable compound in the liquid composition within the range specified above, a method of controlling the proportion of the porogen in the liquid composition within the range specified above, and a method of controlling the irradiation conditions of active energy rays.

Applications of Porous Resin

Application to Power Storage Element or Power Generation Element

The porous resin formed using the liquid composition of the present embodiment can be used as, for example, an insulating layer for a power storage element or a power generation element. In other words, the liquid composition of the present embodiment can be used as a liquid composition for manufacturing an insulating layer for a power storage element or a power generation element. For these applications, for example, it is preferable to apply a liquid composition onto an active material layer formed on an electrode substrate in advance to form an insulating layer (separator).

As the insulating layer for a power storage element or a power generation element, it is known to use, for example, a film-like porous insulating layer having a predetermined size of pores or porosity. When the liquid composition of the present embodiment is used, the proportion of the polymerizable compound, the proportion of the porogen, and the active energy ray irradiation conditions, etc. can be appropriately changed to change the pore size and the porosity. Therefore, the latitude of design is enhanced for the performance of the power storage element and the power generation element. In addition, the liquid composition of the present embodiment can be applied by various application methods. For example, it includes an ink jet method, so that the latitude of design can be enhanced for the forms of the power storage element and the power generation element.

In the insulating layer, the positive electrode and the negative electrode are separated and ion conductivity between the positive electrode and the negative electrode can be secured. In addition, the insulating layer in the present application is not limited to a layer-like form.

In addition, when the liquid composition of the present embodiment can be applied onto the insulating layer (first insulating layer) for the power storage element or the power generation element, an insulating layer (second insulating layer) formed of a porous resin layer is additionally formed. Due to the second insulating layer formed on the first insulating layer, heat resistance, impact resistance, and high temperature shrinkage resistance, etc., as the whole insulating layer can be added or enhanced.

The electrode substrate is not particularly limited as long as it is a conductive substrate. For example, it includes a secondary battery and a capacitor, which are general power storage devices. Of these, aluminum foil, copper foil, titanium foil, and etched foil in which fine holes are made by etching these, which can be suitably used for lithium ion secondary batteries and perforated electrode substrates for use in lithium capacitors are suitable. Further, it is possible to use a woven or non-woven flat carbon paper fibrous electrode used for a power generation device such as a fuel cell or a perforated electrode substrate having fine holes of the perforated electrode substrates mentioned above. Furthermore, in the case of a solar device, in addition to the electrode mentioned above, it is possible to use an article in which a transparent semiconductive thin film such as an indium titanium based oxide is formed on a flat glass or plastic substrate or an article or an electroconductive electrode film such as zinc oxide is thinly formed on a flat glass or plastic substrate or an article.

The active material layer is formed by dispersing a powdery active substance or catalyst composition in a liquid and applying the liquid dispersion onto an electrode substrate followed by fixing and drying. Normally, printing employing a spray, a dispenser, a die coater, or up-draw coating is used for the application, followed by drying.

The positive electrode active material is not particularly limited as long as it is a material capable of reversibly intercalating and deintercalating an alkali metal ion. Typically, an alkali metal-containing transition metal compound can be used as the positive electrode active material. For example, the lithium-containing transition metal compound includes a composite oxide containing lithium and at least one element selected from the group consisting of cobalt, manganese, nickel, chromium, iron, and vanadium.

Specific examples include, but are not limited to, lithium-containing transition metal oxides such as lithium cobaltate, lithium nickelate, and lithium manganate, an olivine type lithium salt such as $LiFePO_4$, chalcogen compounds such as titanium disulfide and molybdenum disulfide, and manganese dioxide. The lithium-containing transition metal oxide is a metal oxide containing lithium and a transition metal or a metal oxide in which the transition metal in the metal oxide is partially substituted with a different element.

Specific examples of the different elements include, but are not limited to, Na, Mg, Sc, Y, Mn, Fe, Co, Ni, Cu, Zn, Al, Cr, Pb, Sb, and B. Of these, Mn, Al, Co, Ni and Mg are preferable. One or two or more kinds of different elements may be used. These positive electrode active materials can be used alone or in combination. An example of the active material in the nickel metal hydride battery is nickel hydroxide.

The negative electrode active material is not particularly limited as long as it is a material capable of reversibly intercalating and deintercalating an alkali metal ion. Typically, a carbon material containing graphite having a graphite-type crystal structure can be used as the negative electrode active material. Examples of such a carbon material include, but are not limited to, natural graphite, spherical or fibrous artificial graphite, non-graphitizable carbon (hard carbon), and graphitizable carbon (soft carbon). An example of the material other than the carbon material is lithium titanate. To enhance the energy density of the lithium ion battery, a high-capacity material such as silicon, tin, a silicon alloy, a tin alloy, silicon oxide, silicon nitride, or tin oxide can also be suitably used as the negative electrode active material.

Examples of the active material in the nickel metal hydride battery include an AB2-based or A2B-based hydrogen intercalating alloy.

Specific examples of the binder for the positive electrode or negative electrode include, but are not limited to PVDF, PTFE, polyethylene, polypropylene, aramid resins, polyamide, polyimide, polyamideimide, polyacrylonitrile, polyacrylic acid, polyacrylic acid methyl ester, polyacrylic acid ethyl ester, polyhexyl acrylate ester, polymethacrylic acid, polymethacrylic acid methyl ester, polymethacrylic acid ethyl ester, polymethacrylic acid hexyl ester, polyvinyl acetate, polyvinylpyrrolidone, polyether, polyethersulfone, hexafluoropolypropylene, styrene butadiene rubber, and carboxymethyl cellulose. In addition, it is possible to use copolymers of two types or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. Two or more selected from these may be mixed and used. Specific examples of the conductive agent contained in the electrode include, but are not limited to, graphites such as natural graphite and artificial graphite, carbon blacks such as acetylene black, ketjen black, channel black, furnace black, lamp black, and thermal black, electroconductive carbon fibers such as carbon fiber and metal fiber, metal powders such as carbon fluoride and aluminum, electroconductive whiskers such as zinc oxide and potassium titanate, electroconductive metal oxides such as titanium oxide, electroconductive organic materials such as phenylene derivatives and graphene derivatives.

In general, for an active material in a fuel cell, as a catalyst for a cathode electrode or an anode electrode, an article is used in which metal fine particles such as platinum, ruthenium, or a platinum alloy are borne on a catalyst bearer such as carbon. To carry the catalyst particle on the surface of the catalyst bearer, for example, the catalyst bearer is suspended in water and the catalyst particle precursor (which contains alloy components such as chloroplatinic acid, dinitrodiaminoplatinum, diplatinum chloride, platinum chloride, bisacetylacetate platinum, dichlorodiammine platinum, dichlorotetramine platinum, diplatinum sulfate ruthenium acid, chloroiridate, rhodium chloride, ferric chloride, cobalt chloride, chromium chloride, gold chloride, silver nitrate, rhodium nitrate, palladium chloride, nickel nitride, ion sulfate, and copper chloride) is added to the suspension and dissolved therein. Thereafter, an alkali is added to produce a hydroxide of a metal and obtain a catalyst bearer on which the hydroxide is carried. The catalyst bearer is applied onto an electrode followed by reducing it under a hydrogen atmosphere, etc., thereby obtaining an electrode onto which the catalyst particle (active material) is applied.

In the case of a solar cell, etc., the active material includes an oxide semiconductor layer of $SnO_2$, $ZnO$, $ZrO_2$, $Nb_2O_5$, $CeO_2$, $SiO_2$, and $Al_2O_3$ in addition to tungsten oxide powder and titanium oxide powder. In the semiconductor layer, a dye is borne, which includes, but are not limited to, a ruthenium-tris transition metal complex, a ruthenium-bis transition metal complex, an osmium-tris transition metal complex, an osmium-bis transition metal complex, a ruthenium-cis-diaqua-bipyridyl complex, a phthalocyanine and porphyrin, and an organic-inorganic perovskite crystal.

Porogen and Electrolyte for Power Storage Element

When a porous resin formed by the liquid composition is used as an insulation layer for a power storage element, the porogen is preferably used as a component contained in an electrolytic solution constituting the power storage element. In other words, it is preferable that the electrolytic solution contain a porogen and an electrolyte described later. A porogen suitably selected as a component contained in the electrolyte as well as a component for forming a porous resin obviates the need for heating to remove the porogen after forming the porous resin and impregnating the porous resin with the electrolytic solution.

Due to the omission of heating, damage to the porous resin that can be caused by heating and damage to the components other than the porous resin (for example, an electrode substrate and an active material layer) can be reduced. In particular, due to reduction of damage to the porous resin, it is possible to prevent a short circuit in the power storage element and diminish reaction unevenness while the power storage element is driven, thereby further enhancing the performance of the power storage element.

Moreover, when removing the porogen by heating, the porogen may partially remain in the porous medium. Such residual porogen may produce gas due to unexpected side reaction inside the electric storage element and degrade the performance of the power storage element. However, a porogen selected usable as the component contained in an electrolyte, for example, a material that does not easily degrade the performance of the power storage element due to a reaction, etc., can reduce the deterioration of the performance.

When a porous resin is used as an insulating layer for a power storage element, a porogen that diminishes decomposition reaction, gas production, etc. during charge and discharge of the power storage element is preferably selected.

Specific examples include, but are not limited to, propylene carbonate, ethyl methyl carbonate, dimethyl carbonate, ethylene carbonate, acetonitrile, γ-butyrolactone, sulfolane, dioxolane, tetrahydrofuran, 2-methyltetrahydrofuran, dimethyl sulfoxide, 1,2-dimethoxy ethane, 1,2-ethoxymethoxy ethane, polyethylene glycol, alcohols, and mixtures thereof. Of these, it is preferable to use at least one member selected from the group consisting of propylene carbonate, ethyl methyl carbonate, dimethyl carbonate, and ethylene carbonate.

The boiling point of the porogen that does not require removing by heating after forming a porous resin is preferably higher than the boiling point of the porogen that requires removing by heating. When the boiling point is high, vaporization of porogen during production is diminished and the composition of the electrolytic solution is prevented from changing from the originally assumed composition. The boiling point is preferably 80 degrees C. or higher and more preferably 85 degrees C. or higher, and furthermore preferably 90 degrees C. or higher. Note that the boiling point of propylene carbonate is 240 degrees C., the boiling point of ethyl methyl carbonate is 107 degrees C., the boiling point of dimethyl carbonate is 90 degrees C., and the boiling point of ethylene carbonate is 244 degrees C.

As described above, when using a porogen functions as the component in an electrolyte constituting a power storage element, the device 100 for manufacturing a porous resin illustrated in FIG. 1 preferably does not include the heating unit 3.

As described above, the electrolyte is used when a porous resin formed of the liquid composition is used as an insulating layer for the power storage element. Examples of the electrolyte include a solid electrolyte that can be dissolved in a porogen and a liquid electrolyte such as an ionic liquid. Due to the inclusion of the electrolyte in the liquid composition, the porogen and the electrolyte constituting the remaining components can function as an electrolytic solution in the power storage element after the porous resin is formed. This obviates the need for heating and removing the porogen and impregnating the porous resin with an electrolytic solution.

Due to the omission of heating, damage to the porous resin that can be caused by heating and damage to the components other than the porous resin (for example, an electrode substrate and an active material layer) can be reduced. In particular, due to reduction of damage to the porous resin, it is possible to prevent a short circuit in the power storage element and diminish reaction unevenness while the power storage element is driven, thereby further enhancing the performance of the power storage element.

Moreover, when removing the porogen by heating, the porogen may partially remain in the porous medium. Such residual porogen may produce gas due to unexpected side reaction inside the electric storage element and degrade the performance of the power storage element. However, a porogen selected usable as the component contained in an electrolyte, for example, a material that does not easily degrade the performance of the power storage element due to a reaction, etc., can reduce the deterioration of the performance.

The solid electrolyte is not particularly limited as long as it can be dissolved in porogen. Examples include inorganic ion salts such as alkali metal salts and alkali earth metal salts, quaternary ammonium salts, supporting salts of acids, and supporting salts of alkalis. Specific examples include, but are not limited to, $LiClO_4$, $LiBF_4$, $LiAsF_6$, $LiPF_6$, LiCF$_3$SO$_3$, LiCF$_3$COO, KCl, NaClO$_3$, NaCl, NaBF$_4$, NaSCN, KBF$_4$, Mg(ClO$_4$)$_2$, and Mg(BF$_4$)$_2$.

Examples of the liquid electrolyte include various ionic liquids containing a cation component and an anion component. It is preferable that the ionic liquid can maintain a liquid state in a wide temperature range including room temperature.

Examples of the cationic component include, but are not limited to, imidazole derivatives such as N,N-dimethylimidazole salt, N,N-methylethylimidazole salt, N,N-methylpropylimidazole salt, aromatic salts such as pyridinium derivatives such as N,N-dimethylpyridinium salt and N,N-methyl propylpyridinium salts, aliphatic quaternary ammonium compounds such as tetraalkylammonium such as trimethylpropyl ammonium salts, trimethylhexyl ammonium salts, and triethylhexyl ammonium salts.

As the anion component, for example, a compound containing fluorine is preferable in terms of stability in the atmosphere. Specific examples include, but are not limited to BF$_4^-$, CF$_3$SO$_3^-$, PF$_4^-$, (CF$_3$SO$_2$)$_2$N$^-$, and B(CN$_4$)$^-$.

The proportion of the electrolyte in the electrolytic solution is not particularly limited and can be suitably selected to suit to a particular application. For example, it is preferably from 0.7 to 4.0 mol/L, more preferably from 1.0 to 3.0 mol/L, and in terms of striking balance between the capacity and output of a power storage element, furthermore preferably from 1.0 to 2.5 mol/L.

Application to White Ink

Since the liquid composition of the present embodiment is whitened when the porogen is removed after forming a porous resin, for example, it is preferable that the liquid composition be contained in white ink applied to a recording medium. In the present application, the white ink is not particularly limited as long as the ink is capable of forming a white image. It includes a non-white substance in a form of ink, which is, for example, transparent or colored other than white.

It is well known that a substance containing an inorganic pigment such as titanium oxide as a coloring material exhibiting white. However, since such white ink has a large specific gravity and easily precipitates, the white ink involves problems with storage stability and discharging stability. In that respect, the white ink of the present embodiment can exhibit white even if it does not contain a white coloring material such as a pigment or dye as a component other than the liquid composition, so that the storage stability and the discharging stability can be enhanced. The white ink of the present embodiment may contain a white coloring material. However, containing substantially no white coloring material is preferable. Regarding containing substantially no white coloring material, it is preferable that the proportion of the white coloring material to the mass of white ink is preferably 0.1 percent by mass or less, more preferably 0.05 percent by mass or less, furthermore preferably 0.01 percent by mass or less, and still further preferably not greater than the detection limit. Particularly preferably, the white ink does not contain a white pigment at all. When the white ink does not substantially contain a white coloring material, the white image formed by the white ink can be reduced in weight. For example, it can be suitably used as white ink for aircraft or vehicle painting.

Also, it is known that white ink containing a plurality of types of polymerizable compounds become cloudy due to phase separation of these polymers during curing. However, such a white ink exhibits white due to phase separation between the polymers but not due to the air layer, so that it has a problem with the degree of whiteness. In this regard, when the liquid composition of the present embodiment is used as a white ink, the white color is exhibited by the porous resin having pores as the air layer, so that a high level of whiteness can be exhibited. Note that the white means a color socially accepted as white. The degree of whiteness can be evaluated by measuring lightness (L*) using a spectrophotometric densitometer such as X-Rite 939, etc. For example, it is preferable that the lightness (L*) and chromaticity (a*, b*) be 70≤L*≤100, −4.5≤a*≤2, −6≤b*≤2.5 for 100 percent duty or more or when the surface of a recording medium is sufficiently covered.

Moreover, since the white ink of the present embodiment forms a layer formed of a porous resin when applied onto a recording medium, it can be used as primer ink with which an undercoat layer (primer layer) is formed to enhance fixability of other inks (for example, ink containing a coloring material) applied to the recording medium after the white ink is applied thereto.

In general, a low-permeable substrate such as coated paper, a glass substrate, a resin film substrate, or a low or non-permeable substrate such as a metal substrate used as a recording medium has a problem with fixability of the ink to the substrate. In this regard, when the white ink (primer ink) of the present embodiment is used, fixability of other ink applied onto an undercoat layer is enhanced because the white ink (primer ink) is well fixed onto a low or non-permeable substrate. In addition, if, a permeable ink (aqueous ink, etc.) that is difficult to use for a low-permeability substrate or a non-permeable substrate is used as the other ink (ink containing a coloring material, etc.) applied later, it is possible to fix the coloring material onto the surface of the porous resin while allowing the ink component to penetrate and diffuse into the porous resin.

In addition, since the white ink (primer ink) forms a white receiving layer, the color and transparency of the recording medium are concealed and the image density of the other ink (ink containing a coloring material, etc.) applied later can be increased.

Application to Solid Freeform Fabrication

Since the liquid composition of this embodiment can form a porous resin layer having a layer thickness in the height direction, a three-dimensional object can be formed by laminating multiple porous resin layers. That is, it is preferable that a composition for solid freeform fabrication to fabricate a solid freeform fabrication object contain the liquid composition of this embodiment. In general, sold freeform fabrication has a problem with distortion of a solid freeform fabrication object ascribable to curing shrinkage. In this respect, since the composition for solid freeform fabrication containing the liquid composition of this embodiment forms a porous medium having a network structure as a result of polymerization inducing phase separation, the internal stress during polymerization is relaxed due to this network structure so that distortion of the solid freeform fabrication object caused by curing shrinkage can be reduced.

Figure 2:
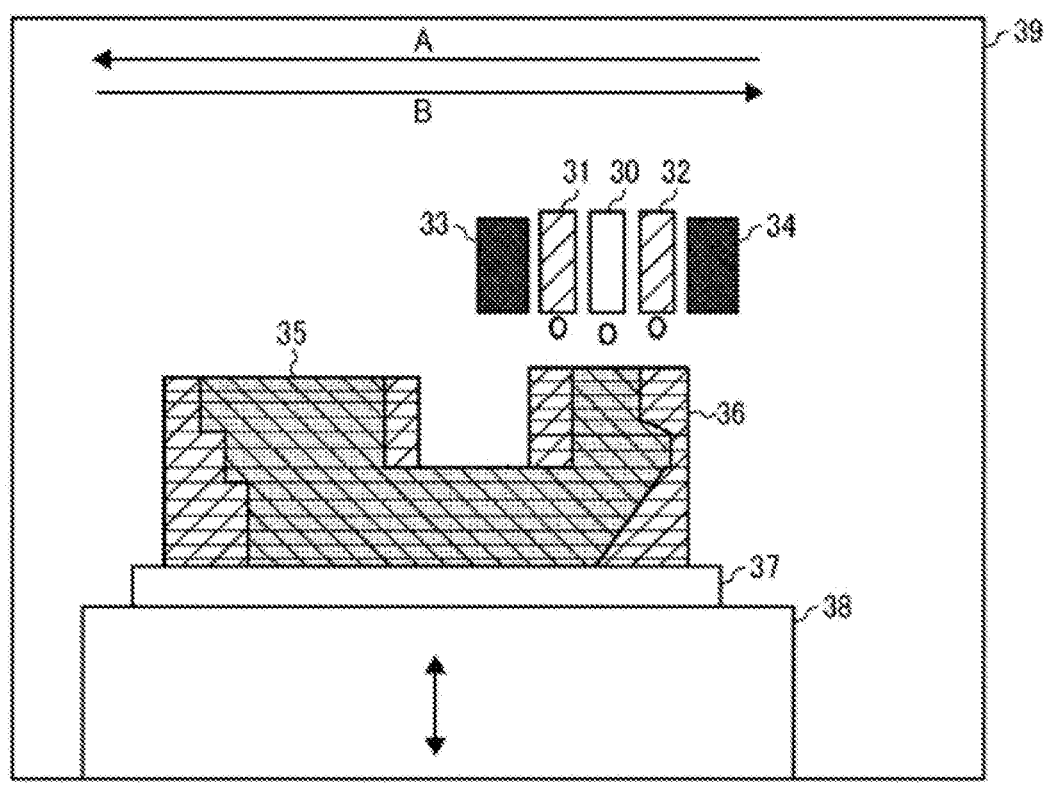
FIG. 2 is a schematic diagram illustrating an example of a fabrication device employing a material jet method.

Next, a fabrication device and a fabrication method of fabricating a solid freeform fabrication object are described with reference to FIG. 2. FIG. 2 is a schematic diagram illustrating an example of the fabrication device employing a material jet method. The fabrication device illustrated in FIG. 2 includes a discharging device (an example of an applying unit) that discharges a liquid composition in an inkjet method, etc., and a curing unit that irradiates the discharged liquid composition with active energy rays to cure and repeats the discharging by the discharging device and the curing by the curing device to fabricate a solid freeform fabrication object. In addition, the fabrication method executed by the fabrication device illustrated in FIG. 2 includes discharging a liquid composition according to an inkjet method and irradiating the discharged liquid composition with active energy rays to cure and repeats the discharging and the irradiating sequentially to fabricate a solid freeform fabrication object.

This fabrication device and the fabrication method will be specifically described. A fabrication device 39 illustrated in FIG. 2 forms laminated layers while discharging a first liquid composition for solid freeform fabrication from a discharging head unit 30 for solid freeform fabrication and a second liquid composition for solid freeform fabrication composed of different ingredients from the first liquid composition from discharging head units 31 and 32 for a support by using a head unit having inkjet heads arranged movable in the directions indicated by the arrows A and B and solidifying each of these compositions for solid freeform fabrication by ultraviolet irradiators 33 and 34 placed adjacent to the discharging head units 31 and 32, respectively. More specifically, for example, after the discharging head units 31 and 32 for a support discharge the second composition onto a substrate 37 for supporting a fabrication object and irradiate the second liquid composition with active energy rays to cure to form a first support layer having a hollow space (pool) for fabrication, the discharging head unit 30 for fabrication object discharges the first composition onto the hollow space followed by irradiation of active energy rays for solidification, thereby forming a first fabrication layer. This step is repeated multiple times in accordance with the required number of lamination while moving a stage 38 up and down in the vertical direction to laminate the support layer and the fabrication layer to manufacture a solid freeform fabrication object 35. Thereafter, a laminated support 36 is removed, if desired. Although there is only one of the discharging head unit 30 for a fabrication object in FIG. 2, the device may have two or more discharging head units 30.

Application to Laminates

The liquid composition of the present embodiment can be applied to various objects such as a substrate and cure, whereby a porous resin layer can be laminated on various objects such as the substrate. In other words, it is preferable that the liquid composition of the present embodiment be contained in a composition for a laminate to form a laminate including a target such as a substrate and a porous resin layer formed on the target. Examples include, as described above, liquid compositions for use in a power storage element or a power generation element, a liquid compositions for use in white ink, a liquid composition for use in a solid freeform fabrication. A liquid composition for use in the power storage element or the power generation element is applied to the active material layer to laminate a porous resin layer as an insulating layer, a liquid composition for use in white ink is applied to a recording medium to form a porous resin layer as a white image, and a liquid composition for use in solid freeform fabrication is applied to the porous resin layer after curing to laminate a porous resin layer as a predetermined layer of a solid freeform fabrication object. In general, when a layer is laminated on a target object such as a substrate, an interface exists between the object and the layer. Therefore, when the adhesion at the interface is weak, the object and the layer are easily peeled off. In particular, when forming a layer and laminating the layers by polymerization reaction, the polymer is likely to be distorted during polymerization, which tends to cause peeling-off between the object and the layer. In this regard, when the liquid composition of the present embodiment is used for a laminate, a porous medium having a network structure is formed along with polymerization-induced phase separation, so that the internal stress during polymerization is relieved by the network structure. This is preferable because distortion of the fabrication object ascribable to curing shrinkage is reduced and as a result, peeling-off of the object and the layer is prevented.

Application to Bearer

When the liquid composition of the present embodiment is mixed with a functional substance to form a porous resin, a bearer having the functional substance borne on the surface of the porous resin can be manufactured. In other words, the liquid composition of the present embodiment and a composition containing a functional substance can be used as a composition for forming a bearer to manufacture a bearer bearing the functional material. The surface of the porous resin means not only the outer surface of the porous resin but also the inner surface communicating with the outside. Since the functional substance can be borne in the void communicating with the outside, the surface area capable of bearing the functional substance is increased.

When the composition for forming a bearer of the present embodiment is used, the proportion of the polymerizable compound, the proportion of the porogen, and the active energy ray irradiation conditions, etc. can be appropriately changed to change the pore size and the porosity. Therefore, the latitude of design is enhanced for the performance of the bearer. In addition, since the composition for forming a bearer of the present embodiment can be applied by various application methods, it can be applied by, for example, an inkjet method, so that the latitude of design can be enhanced for the forms of the bearer. Specifically, the bearer can be uniformly formed not only on a flat surface but also a curved surface, which obviates the need for cutting the bearer in accordance with the form of the target to adjust the form. In addition, it is possible to form a bearer having a particle form by forming droplets by discharging in an inkjet method and irradiating jetted droplets in air or independent droplets attached onto a substrate with active energy rays.

The functional substance directly or indirectly demonstrates a predetermined function and it is preferable that the function of the substance be enhanced or improved as the area of the substance borne on a porous resin increase. It is more preferable that the functional substance borne on a porous resin demonstrate the function when located on the exterior surface and/or the interior surface communicating with the outside (conversely, when the functional substance is located on the internal surface not communicating with the outside, the function is not well demonstrated). The functional substance may be dissolved or dispersed in a liquid composition. However, a dispersible functional substance is preferable. Examples of the functional substance are not particularly limited and include, but are not limited to, a photocatalyst and a physiologically active substance.

Photocatalyst demonstrates photocatalytic active upon irradiation of light (excitation light having an energy having a band gap or more between the valence band and conductive band of photocatalyst) in a particular wavelength range. When photocatalyst is photocatalytically active, it demonstrates various actions such as an antibacterial action, a deodorizing action, and a decomposing action of toxic substances such as a volatile organic compound (VOC).

Specific examples of the photocatalyst include, but are not limited to, metal oxides such as anatase or rutyl type titanium oxide (IV) ($TiO_2$), tungsten oxide (III) ($W_2O_3$), tungsten oxide (IV) ($WO_2$), tungsten oxide (VI) ($WO_3$), zinc oxide (ZnO), iron oxide (III) ($Fe_2O_3$), strontium titanate ($SrTiO_3$), bismuth oxide (III) ($Bi_2O_3$), bismuth vanadate ($BiVO_4$), tin oxide (II) (SnO), tin oxide (IV) ($SnO_2$), tin oxide (VI) ($SnO_3$), zirconium oxide ($ZrO_2$), cerium (II) oxide (CeO), cerium (IV) oxide ($CeO_2$), barium titanate ($BaTiO_3$), indium (III) oxide ($In_2O_3$), copper (I) oxide ($Cu_2O$), copper oxide (II) (CuO), potassium tantalate ($KTaO_3$), and potassium niobate ($KNbO_3$), metal sulfides such as cadmium sulfide (CdS), zinc sulfide (ZnS), and indium sulfide (InS), metal selenates such as cadmium selenate ($CdSeO_4$) and zinc selenide (ZnSe), metal nitrides such as gallium nitride (GaN). It is preferable to contain at least one of titanium (IV) oxide ($TiO_2$), tin (IV) oxide ($SnO_2$), tungsten oxide (III) ($W_2O_3$), tungsten oxide (IV) ($WO_2$), and tungsten (VI) oxide ($WO_3$) and it is more preferable to contain anatase type titanium (IV) oxide ($TiO_2$).

Physiologically active substances are an active ingredient used to demonstrate a physiological effect on a living body. Examples include, but are not limited to, polymers including biopolymers including proteins such as antibodies and enzymes and nucleic acids such as DNA and RNA in addition to low molecular weight compounds including pharmaceutical compounds, food compounds, and cosmetic compounds. In addition, according to the physiological effect, a physiologically active substance demonstrates a physiological activity at a target site. For example, it causes quantitative and/or quality changes and impacts on living bodies, tissues, cells, proteins, DNA, and RNA. In addition, physiological active means that a physiologically active substance acts on a target site (for example, a target tissue) to cause changes or impacts. The target site is preferably, for example, a receptor present on or in the cell. In this case, a signal is transmitted to the cell due to the physiological activeness of the physiologically active substance binding to a specific receptor, resulting in demonstration of a physiological effect. The physiologically active substance may be converted into a mature form by an enzyme in a living body and thereafter binds with a specific receptor to demonstrate a physiological effect. In this case, in the present disclosure, a substance before being converted to a mature form is also included in the physiologically active substance. The physiologically active substance may be created in a living organism (human or non-human organism) or may be artificially synthesized. When a particulate bearer is formed using a liquid composition containing such a physiologically active substance, the physiologically active substance may be used as particles that deliver the physiologically active substance to a target site in order to demonstrate a desired physiological effect, that is, particles for use in a drug delivery system (DDS) or sustained-release particles that continue to release a drug over a long period of time. Further, when a sheet-like bearer is formed using a liquid composition containing a physiologically active substance, it can be used as a sustained-release sheet that continuously releases a drug over a long period of time.

Application tor Surface Modification

The exterior surface of the porous resin formed by the liquid composition of the present embodiment has fine irregularities derived from being porous so that wettability can be controlled. Specifically, when the resin constituting the porous resin is hydrophilic, a higher hydrophilicity can be imparted to the exterior surface of the porous resin than to a flat surface formed by the resin. In addition, when the resin constituting the porous resin is water repellent, a higher level of water repellency can be imparted to the exterior surface of the porous resin than to the flat surface formed by the resin. Therefore, the surface modification layer can be formed by applying the surface modification liquid containing the liquid composition of the present embodiment to the surface of a target object and the wettability of the surface of the target object can be easily modified.

When the liquid composition of the present embodiment is used, the proportion of the polymerizable compound, the proportion of the porogen, and the active energy ray irradiation conditions, etc. can be appropriately changed to change the roughness (concave and convex ascribable to pores and porosity) on the exterior surface of the porous resin. Therefore, the latitude of design is enhanced for the performance of the surface modification layer. In addition, since the liquid composition of the present embodiment can be applied by various application methods, it can be applied by, for example, an ink jet method, so that the latitude of design can be enhanced for the forms of the surface modification layer. Specifically, the surface modification layer can be uniformly formed not only on a flat surface but also on a curved surface.

Application to Separation Layer or Reaction Layer

When a fluid such as a liquid or a gas passes through the porous resin formed by the liquid composition of the present embodiment, the porous resin can be used as a fluid flow path. When the porous resin can be used as a fluid flow path, the porous resin can be used as a separation layer for separating a predetermined substance from the fluid or as a reaction layer (microreactor) that provides a minute reaction field to the fluid. In other words, the liquid composition of the present embodiment is preferably contained in the composition for forming a separation layer or the composition for forming a reaction layer. It is preferable that fluid can uniformly and efficiently pass through the porous resin for use in these applications. In this regard, the porous resin formed by the liquid composition of the present embodiment has a porous structure formed by phase separation. Therefore, the pores are continuously connected and the fluid uniformly and efficiently passes through the porous structure.

Fluid such as liquid and gas passing through the porous resin is not particularly limited. For example, air permeability of the porous resin measured according to JIS P8117 format is preferably 500 seconds/100 mL or less and more preferably 300 seconds/100 mL or less. At the time, the air permeability is measured using, for example, a Gurley type densometer (manufactured by TOYO SEIKI KOGYO CO. LTD.).

The separation means that a predetermined substance contained in a fluid mixture can be removed or concentrated. Regarding the removal, it includes a case when a particular substance is partially or completely removed from a fluid mixture.

The reaction field refers to a place where a predetermined chemical reaction proceeds when a predetermined substance contained in a fluid passes through.

When used for a separation layer, the liquid composition of the present embodiment preferably contains a polymerizable compound having a functional group capable of interacting with a predetermined substance contained in a fluid. When a porous resin is formed using the liquid composition, a functional group capable of interacting with a predetermined substance is arranged on the surface (inner surface and outer surface) of the porous resin, so that the predetermined substance can be effectively separated. The polymerizable compound having a functional group capable of interacting with a predetermined substance contained in the fluid may be a part or all of the polymerizable compound contained in the liquid composition. In the present disclosure, in addition to a case where the functional group itself can interact with the predetermined substance, the functional group capable of interacting with a predetermined substance includes a case via an additional graft polymerization.

When applied to a reaction layer, the liquid composition of the present embodiment preferably contains a polymerizable compound having a functional group providing a reaction field to a fluid. When a porous resin is formed using the liquid composition, a reaction field is effectively provided because the functional group providing the reaction field to a fluid is arranged on the surface (inner surface and outer surface) of the porous resin. The polymerizable compound having a functional group providing a reaction field to a fluid may be a part or all of the polymerizable compound contained in the liquid composition. In the present disclosure, in addition to a case where the functional group itself can provide a reaction field to a fluid, the functional group providing a reaction field to a fluid includes a case where a reaction field is provided via an additional graft polymerization.

The separation layer and the reaction layer can be formed by, for example, filling a liquid composition in a container capable of forming a fluid inflow portion and a fluid outflow portion such as a glass tube and causing it to cure. In addition, the separation layer and the reaction layer having a flow path with a desired shape formed of a porous resin can be produced (drawn) by printing the liquid composition on a substrate by an inkjet method, etc. Since the flow paths of a separation layer and a reaction layer can be printed, it is possible to provide the separation layer and the reaction layer in which the flow paths can be appropriately changed to suit to an application.

When the composition for forming a separation layer of the present embodiment and the composition for forming a reaction layer of the present embodiment are used, the proportion of the polymerizable compound, the proportion of the porogen, and the active energy ray irradiation conditions, etc. can be appropriately changed to change the pore size and the porosity of the porous resin. Therefore, the latitude of design is enhanced for the performance of the separation layer and the reaction layer.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but not limited thereto.

Calculation of Hansen Solubility Parameter C and Interaction Radius D of Polymerizable Compound According to the following procedure, Hansen solubility parameter C and the interaction radius D was calculated for the following four types of polymerizable compounds.

Polymerizable compound X: Tricyclodecane dimethanol diacrylate (manufactured by Daicel Ornex Co., Ltd.)
Polymerizable compound Y: ε-caprolactone-modified tris-(2-acryloxyethyl)isocyanurate (manufactured by Shin-Nakamura Chemical Co., Ltd.)
Polymerizable compound Z: pentaerythritol tetraacrylate (manufactured by ARKEMA)
Polymerizable compound X+Y: a mixture of 50 percent by mass polymerizable compound X and 50 percent by mass polymerizable compound Y Preparation of Composition for Measuring Transmission First, a polymerizable compound whose Hansen solubility parameter C and the interaction radius D were desired and the following 21 types of solvents for evaluation with known Hansen solubility parameters (HSP) were prepared and the polymerizable compound, each solvent for evaluation, and a polymerization initiator were mixed with the following proportion to prepare a composition for measuring transmission.

Proportion of Composition for Measuring Transmission
Polymerizable compound whose Hansen solubility parameter C was desired: 28.0 percent by mass
Solvent for evaluation with known Hansen solubility parameter (HSP): 70.0 percent by mass
Polymerization initiator (Irgacure 819, manufactured by BASF SE): 2.0 percent by mass Solvent Group (21 types) for Evaluation
Ethanol, 2-propanol, mesitylene, dipropylene glycol monomethyl ether, N-methyl 2-pyrrolidone, γ-butyrolactone, propylene glycol monomethyl ether, propylene carbonate, ethyl acetate, tetrahydrofuran, acetone, n-tetradecane, ethylene glycol, diethylene glycol monobutyl ether, diethylene glycol butyl ether acetate, methyl ethyl ketone, methyl isobutyl ketone, 2-ethylhexanol, diisobutyl ketone, benzyl alcohol, and 1-bromonaphthalene Measurement of Light Transmission (Compatibility Evaluation)

The prepared composition for measuring transmission was infused into a quartz cell and the transmission of light (visible light) having a wavelength of 550 nm of the composition for measuring transmission was measured while stirring at 300 rpm using a stir bar. In this Example, when the light transmission was 30 percent or more, the polymerizable compound and the solvent for evaluation were determined as compatible. When the light transmission was less than 30 percent, the polymerizable compound and the solvent for evaluation were determined as incompatible. Various conditions regarding the measurement of light transmission are as follows:

Quartz cell: Special micro cell with screw cap (trade name: M25-UV-2)
Transmission measuring device: USB4000, manufactured by Ocean Optics, Inc
Rate of stirring: 300 rpm
Measuring wavelength: 550 nm
Reference: Light transmission measured at a wavelength of 550 nm with the quartz cell filled with air (transmission: 100 percent)

The result of compatibility evaluation of the polymerizable compound and the solvent for evaluation was shown in Table 1 according to the following evaluation criteria.

Evaluation Criteria
a: Polymerizable compound and solvent for evaluation are compatible
b: Polymerizable compound and solvent for evaluation are not compatible

TABLE 1

|  | Polymerizable compound | | | |
|---|---|---|---|---|
| Solvent for evaluation | X | Y | Z | X + Y |
| Ethanol | a | b | a | a |
| 2-Propanol | a | b | a | a |
| Mesitylene | a | a | a | a |
| Dipropylene glycol monomethyl ether | a | a | a | a |
| N-methyl2-pyrroridone | a | a | a | a |
| γ-butyrolactone | a | a | a | a |
| Propylene glycol monomethylether ether | a | a | a | a |

TABLE 1-continued

| | Polymerizable compound | | | |
|---|---|---|---|---|
| Solvent for evaluation | X | Y | Z | X + Y |
| Propylene carbonate | a | a | a | a |
| Ethyl acetate | a | a | a | a |
| Tetrahydrofuran | a | a | a | a |
| Acetone | a | a | a | a |
| n-tetradecane | a | b | b | b |
| Ethylene glycol | b | b | b | b |
| Diethylene glycol monobutyl ether | a | a | a | a |
| Diethylene glycol butyl ether acetate | a | a | a | a |
| Methyl ethyl ketone | a | a | a | a |
| Methyl isobutyl ketone | a | a | a | a |
| 2-ethylhexanol | a | b | b | a |
| Diisobutyl ketone | a | a | a | a |
| Benzyl alcohol | a | a | a | a |
| 1-Bromonaphtalene | a | a | a | a |

Calculation by Hansen Solubility Sphere Method

Each of the Hansen solubility parameter (HSP) of the solvents for evaluation demonstrating compatibility and the Hansen solubility parameter (HSP) of the solvents for evaluation not demonstrating compatibility in the compatibility evaluation were plotted in the Hansen space. Based on the Hansen solubility parameter (HSP) of each of the plotted solvents for evaluation, a virtual sphere (Hansen sphere) was created which included the Hansen solubility parameters (HSP) of the solvent group for evaluation demonstrating compatibility and excluded the Hansen solubility parameters of the solvent group for evaluation not demonstrating compatibility. The center of the Hansen sphere was calculated as the Hansen solubility parameter C and the radius of the Hansen sphere was calculated as the interaction radius D.

Calculated Hansen Solubility Parameter C and Interaction Radius D

The calculated Hansen solubility parameter C and the interaction radius D of the polymerizable compound were shown below.

Polymerizable compound X: Hansen solubility parameter C (17.21, 8.42, 7.98), interaction radius D (11.8)

Polymerizable compound Y: Hansen solubility parameter C (18.51, 9.04, 4.75), interaction radius D (9.5)

Polymerizable compound Z: Hansen solubility parameter C (19.65, 19.25, 4.48), interaction radius D (19.8)

Polymerizable compound X+Y: Hansen solubility parameter C (17.71, 8.62, 8.67), interaction radius D (11.4)

Calculation of Hansen Solubility Parameter A and Interaction Radius B of Resin Formed by Polymerization of Polymerizable Compound According to the following procedure, Hansen solubility parameter A and the interaction radius B were calculated for the resin formed by polymerizing the following four types of polymerizable compounds.

Polymerizable compound X: Tricyclodecane dimethanol diacrylate (manufactured by Daicel Ornex Co., Ltd.)

Polymerizable compound Y: ε-caprolactone-modified tris-(2-acryloxyethyl)isocyanurate (manufactured by Shin-Nakamura Chemical Co., Ltd.)

Polymerizable compound Z: pentaerythritol tetraacrylate (manufactured by ARKEMA)

Polymerizable compound X+Y: a mixture of 50 percent by mass polymerizable compound X and 50 percent by mass polymerizable compound Y Preparation of Composition for Measuring Haze First, a precursor (polymerizable compound) of a resin whose Hansen solubility parameter A and the interaction radius B were desired and 21 types of solvents for evaluation with known Hansen solubility parameters (HSP) were prepared and the polymerizable compound, each solvent for evaluation, and a polymerization initiator were mixed with the following proportion to prepare a composition for measuring haze.

Proportion of Composition for Measuring Haze

Precursor (polymerizable compound) of resin whose Hansen solubility parameter A was desired: 28.0 percent by mass Solvent for evaluation with known Hansen solubility parameter (HSP): 70.0 percent by mass Polymerization initiator (Irgacure 819, manufactured by BASF SE): 2.0 percent by mass Solvent Group (21 types) for Evaluation Ethanol, 2-propanol, mesitylene, dipropylene glycol monomethyl ether, N-methyl 2-pyrrolidone, γ-butyrolactone, propylene glycol monomethyl ether, propylene carbonate, ethyl acetate, tetrahydrofuran, acetone, n-tetradecane, ethylene glycol, diethylene glycol monobutyl ether, diethylene glycol butyl ether acetate, methyl ethyl ketone, methyl isobutyl ketone, 2-ethylhexanol, diisobutyl ketone, benzyl alcohol, and 1-bromonaphthalene Preparation of Element for Measuring Haze Resin particulates were uniformly dispersed on an alkali-free glass substrate by spin coating to obtain a gap agent. Subsequently, the substrate coated with the gap agent and an alkali-free glass substrate to which no gap agent was applied were attached to each other in such a manner that the gap agent was sandwiched between the substrate and the alkali-free glass substrate. Next, the composition for measuring haze prepared was filled into between the attached substrates utilizing the capillary phenomenon to produce an element for measuring haze before UV irradiation. Subsequently, the element for measuring haze before UV was irradiated with UV to cause the composition for measuring haze to cure. Finally, the periphery of the substrate was sealed with a sealant to prepare an element for measuring haze. Conditions at the time of preparation are as follows.

Alkali-free glass substrate: OA-10G, 40 mm, t=0.7 mm, manufactured by Nippon Electric Glass Co., Ltd.

Gap agent: Resin fine particles Micropearl GS-L100, average particle size 100 μm, manufactured by SEKISUI CHEMICAL CO., LTD.

Spin coating conditions: Amount of liquid dispersion 150 μL, rate of rotation 1000 rpm, time of rotation 30 s Amount of composition for measuring haze: 160 μL UV irradiation conditions: UV-LED is used as a light source, light source wavelength 365 nm, irradiation intensity 30 mW/cm$^2$, time of irradiation 20 seconds Sealant: TB3035B (manufactured by ThreeBond Co., Ltd.)

Measurement of Haze Value (Cloudiness) (Compatibility Evaluation)

The haze value (cloudiness) was measured using the prepared element for measuring haze before UV irradiation and the element for measuring haze. Using the measurement value for the element for measuring haze before UV irradiation as a reference (haze value 0), the increasing ratio of the measurement value (haze value) for the element for measuring haze to the measurement value (haze value) for the element for measuring haze before UV irradiation was calculated. In this Example, when the increase ratio of the haze value was 1.0 percent or more, the resin and the solvent for evaluation were determined as incompatible. When the increase ratio was less than 1.0 percent, the resin and the solvent for evaluation were determined as compatible. The instruments used for the measurement are as follows.

Haze measuring device: Haze meter NDH5000, manufactured by Nippon Denshoku Industries Co., Ltd.

The result of compatibility evaluation of the resin formed by the polymerization of the polymerizable compound and the solvent for evaluation is shown in Table 2 according to the following evaluation criteria.

Evaluation Criteria
a: Resin formed by polymerization of polymerizable compound and solvent for evaluation are not compatible
b: Resin formed by polymerization of polymerizable compound and solvent for evaluation are compatible

TABLE 2

| Solvent for evaluation | Resin formed by polymerization of polymerizable compound (for convenience, it is represented by the symbol of the polymerizable compound used for the polymerization) | | | |
|---|---|---|---|---|
| | X | Y | Z | X + Y |
| Ethanol | a | a | a | a |
| 2-Propanol | a | a | a | a |
| Mesitylene | b | a | a | a |
| Dipropylene glycol monomethyl ether | a | a | b | a |
| N-methyl2-pyrroridone | b | b | b | b |
| γ-butyrolactone | a | b | b | b |
| Propylene glycol monomethylether | a | a | a | a |
| Propylene carbonate | a | b | b | a |
| Ethyl acetate | a | a | a | a |
| Tetrahydrofuran | b | b | b | b |
| Acetone | a | a | a | a |
| n-tetradecane | a | a | a | a |
| Ethylene glycol | a | a | a | a |
| Diethylene glycol monobutyl ether | a | a | a | a |
| Diethylene glycol butyl ether acetate | a | a | b | a |
| Methyl ethyl ketone | a | a | a | a |
| Methyl isobutyl ketone | a | a | a | a |
| 2-Ethylhexanol | a | a | a | a |
| Diisobutyl ketone | a | a | a | a |
| Benzyl alcohol | b | b | b | b |
| 1-Bromonaphtalene | b | b | b | b |

Calculation by Hansen Solubility Sphere Method

Each of the Hansen solubility parameter (HSP) of the solvents for evaluation demonstrating compatibility and the Hansen solubility parameter (HSP) of the solvents for evaluation not demonstrating compatibility in the measuring (compatibility evaluation) of haze value (cloudiness) were plotted in the Hansen space. Based on the Hansen solubility parameter (HSP) of each of the plotted solvents for evaluation, a virtual sphere (Hansen sphere) was created which included the Hansen solubility parameters (HSP) of the solvent group for evaluation demonstrating compatibility and excluded the Hansen solubility parameters of the solvent group for evaluation not demonstrating compatibility. The center of the Hansen sphere was calculated as the Hansen solubility parameter A and the radius of the Hansen sphere was calculated as the interaction radius B.

Calculated Hansen solubility parameter A and Interaction radius B

Hansen solubility parameter A and the interaction radius B of the resin formed by polymerization of the calculated polymerizable compound are as follows.

Resin formed by polymerization of polymerizable compound X: Hansen solubility parameter A (20.02, 5.22, 6.15), interaction radius B (8.3)

Resin formed by polymerization of polymerizable compound Y: Hansen solubility parameter A (19.89, 10.47, 7.32), interaction radius B (8.2)

Resin formed by polymerization of polymerizable compound Z: Hansen solubility parameter A (21.59, 7.83, 7.75), interaction radius B (11.4)

Resin formed by polymerization of polymerizable compound X+Y: Hansen solubility parameter A (19.67, 9.68, 7.49), interaction radius B (7.7)

Example 1-1

A liquid composition was prepared by mixing the materials in the following proportions.
Polymerizable compound X: 28.0 percent by mass
Porogen (ethanol): 70.0 percent by mass
Polymerization initiator (Irgacure 819, manufactured by BASF SE): 2.0 percent by mass The relative energy difference (RED) calculated based on the following relationship 2 from the calculated Hansen solubility parameter C of the polymerizable compound X, the calculated interaction radius D of the polymerizable compound X, and Hansen solubility parameter of the solvent (porogen) was 0.998.

Relative energy difference (RED) 2={Distance between (Hansen solution parameter C of the polymerizable compound)+(Hansen solution parameter of the solvent)}/(interaction diameter D of the polymerizable compound))   Relationship 2

Also, the relative energy difference (RED) calculated based on the following relationship 1 from the calculated Hansen solubility parameter A of the resin formed by the polymerization of the polymerizable compound X, the calculated interaction radius B of the resin formed by the polymerization of the polymerizable compound X, and Hansen solubility parameter of the solvent (porogen) was 1.941.

Relative energy difference (RED) 1={Distance between (Hansen solution parameter A of the resin)+(Hansen solution parameter of the solvent)}/(interaction diameter B of the resin)}   Relationship 1

Further, the viscosity of the liquid composition at 25 degrees C. measured using a viscometer (RE-550L, manufactured by TOKI SANGYO CO., LTD.) was 30.0 mPa·s or less.

EXAMPLES AND COMPARATIVE EXAMPLES

The liquid composition of each Example and Comparative Example was obtained in the same manner as in Example 1-1 except that the composition was changed to those shown in Tables 3 to 10. The values of the compositions shown in Tables 3 to 10 are represented in percent by mass. Also, the relative energy difference (RED) calculated based on the relationship 2 (represented as RED of polymerizable compound and porogen in Tables 3 to 10) and Relative energy difference (RED) calculated based on the relationship 1 (Represented as RED of resin and porogen in Tables 3 to 10) are show in Tables 3 to 10.

Also, viscosities at 25 degrees C. of the liquid compositions of Examples and Comparative Examples are shown in Tables 3 to 10 according to the following evaluation criteria. In addition, in the evaluation of light transmission described later, when the light transmission is less than 30 percent (evaluation b), in other words, when the components in the liquid composition were determined as not compatible, the viscosity thereof was not measured and—is shown in Tables 3 to 10.

Evaluation Criteria
a: Viscosity of the liquid composition is 30.0 mPa·s or less
b: Viscosity of the liquid composition is greater than 30.0 mPa·s In Tables 3 to 10, EC/DMC/EMC mixture+LiPF$_6$ represents a solution in which LiPF$_6$ as an electrolyte was added to a mixture of ethylene carbonate (EC), dimethyl carbonate (DMC), and ethylmethyl carbonate (EMC) (a mixture with a mass ratio of EC:DMC:EMC=2:2:1) in such a manner that the concentration of LiPF$_6$ was 1 mol/L. In Tables 3 to 10, for convenience, solution containing LiPF$_6$ is shown in the column of solvent (porogen). In the present disclosure, the electrolyte such as LiPF$_6$ is not defined as a component contained in the solvent (porogen) but a component that may be contained in the liquid composition.

TABLE 3

| | | Example 1-1 | 1-2 | 1-3 | 1-4 | 1-5 | 1-6 | 1-7 | 1-8 |
|---|---|---|---|---|---|---|---|---|---|
| Polymerizable compound | X | 28.0 | 28.0 | 28.0 | 28.0 | 28.0 | 28.0 | 28.0 | 28.0 |
| | Y | | | | | | | | |
| | Z | | | | | | | | |
| | X + Y | | | | | | | | |
| Solvent (porogen) | Ethanol | 70.0 | | | | | | | |
| | 2-Propanol | | 70.0 | | | | | | |
| | Methyl decanoate | | | 70.0 | | | | | |
| | Ethylene glycol monobutyl ether | | | | 70.0 | | | | |
| | Ethylene glycol monoisopropyl ether | | | | | 70.0 | | | |
| | Ethyl methyl carbonate | | | | | | 70.0 | | |
| | Dimethyl carbonate | | | | | | | 70.0 | |
| | Propylene carbonate | | | | | | | | 70.0 |
| | EC/DMC/EMC mixture + LiPF$_6$ | | | | | | | | |
| | 1-Bromonaphtalene | | | | | | | | |
| | Tetrahydrofuran | | | | | | | | |
| | Benzyl alcohol | | | | | | | | |
| | Cyclohexanone | | | | | | | | |
| | 1,3-butanediol | | | | | | | | |
| Polymerization initiator | Irgacure 819 | 2.0 | 2.0 | 2.0 | 2.0 | 2.0 | 2.0 | 2.0 | 2.0 |
| RED of polymerizable compound and porogen | | 0.998 | 0.778 | 0.576 | 0.505 | 0.481 | 0.270 | 0.325 | 0.995 |
| RED of resin and porogen | | 1.941 | 1.603 | 1.010 | 1.220 | 1.330 | 1.125 | 1.230 | 1.559 |
| Viscosity (mPa · s) | | a | a | a | a | a | a | a | a |

| | | Example 1-9 | 1-10 | 1-11 | 1-12 | 1-13 | 1-14 | 1-15 |
|---|---|---|---|---|---|---|---|---|
| Polymerizable compound | X | 28.0 | 10.0 | 10.0 | 10.0 | 48.0 | 48.0 | 48.0 |
| | Y | | | | | | | |
| | Z | | | | | | | |
| | X + Y | | | | | | | |
| Solvent (porogen) | Ethanol | | 89.5 | | | 50.0 | | |
| | 2-Propanol | | | 89.5 | | | 50.0 | |
| | Methyl decanoate | | | | | | | |
| | Ethylene glycol monobutyl ether | | | | | | | |
| | Ethylene glycol monoisopropyl ether | | | | 89.5 | | | 50.0 |
| | Ethyl methyl carbonate | | | | | | | |
| | Dimethyl carbonate | | | | | | | |
| | Propylene carbonate | | | | | | | |
| | EC/DMC/EMC mixture + LiPF$_6$ | 70.0 | | | | | | |
| | 1-Bromonaphtalene | | | | | | | |
| | Tetrahydrofuran | | | | | | | |
| | Benzyl alcohol | | | | | | | |
| | Cyclohexanone | | | | | | | |
| | 1,3-butanediol | | | | | | | |
| Polymerization initiator | Irgacure 819 | 2.0 | 0.5 | 0.5 | 0.5 | 2.0 | 2.0 | 2.0 |
| RED of polymerizable compound and porogen | | 0.427 | 0.998 | 0.778 | 0.481 | 0.998 | 0.778 | 0.481 |
| RED of resin and porogen | | 1.356 | 1.941 | 1.603 | 1.330 | 1.941 | 1.603 | 1.330 |
| Viscosity (mPa · s) | | a | a | a | a | a | a | a |

TABLE 4

| | | Comparative Example | | | | |
|---|---|---|---|---|---|---|
| | | 1-1 | 1-2 | 1-3 | 1-4 | 1-5 |
| Polymerizable compound | X | 28.0 | 28.0 | 28.0 | 28.0 | 28.0 |
| | Y | | | | | |
| | Z | | | | | |
| | X + Y | | | | | |
| Solvent (porogen) | Ethanol | | | | | |
| | 2-Propanol | | | | | |
| | Methyl decanoate | | | | | |
| | Ethylene glycol monobutyl ether | | | | | |
| | Ethylene glycol monoisopropyl ether | | | | | |
| | Ethyl methyl carbonate | | | | | |
| | Dimethyl carbonate | | | | | |
| | Propylene carbonate | | | | | |
| | EC/DMC/EMC mixture + $LiPF_6$ | | | | | |
| | 1-Bromonaphtalene | 70.0 | | | | |
| | Tetrahydrofuran | | 70.0 | | | |
| | Benzyl alcohol | | | 70.0 | | |
| | Cyclohexanone | | | | 70.0 | |
| | 1:3-Butane diol | | | | | 70.0 |
| Polymerization initiator | Irgacure 819 | 2.0 | 2.0 | 2.0 | 2.0 | 2.0 |
| RED of polymerizable compound and porogen | | 0.800 | 0.241 | 0.555 | 0.263 | 1.102 |
| RED of resin and porogen | | 0.382 | 0.809 | 0.999 | 0.670 | 2.000 |
| Viscosity (mPa · s) | | a | a | a | a | — |

TABLE 5

| | | Example | | | | |
|---|---|---|---|---|---|---|
| | | 2-1 | 2-2 | 2-3 | 2-4 | 2-5 |
| Polymerizable compound | X | | | | | |
| | Y | 28.0 | 28.0 | 28.0 | 28.0 | 28.0 |
| | Z | | | | | |
| | X + Y | | | | | |
| Solvent (porogen) | Ethanol | | | | | |
| | 2-Propanol | | | | | |
| | Methyl decanoate | 70.0 | | | | |
| | Ethylene glycol monobutyl ether | | 70.0 | | | |
| | Ethylene glycol monoisopropyl ether | | | 70.0 | | |
| | Ethyl methyl carbonate | | | | 70.0 | |
| | Dimethyl carbonate | | | | | 70.0 |
| | Propylene carbonate | | | | | |
| | EC/DMC/EMC mixture + $LiPF_6$ | | | | | |
| | 1-Bromonaphtalene | | | | | |
| | Tetrahydrofuran | | | | | |
| | Benzyl alcohol | | | | | |
| | Cyclohexanone | | | | | |
| | 1:3-Butane diol | | | | | |
| Polymerization initiator | Irgacure 819 | 2.0 | 2.0 | 2.0 | 2.0 | 2.0 |
| RED of polymerizable compound and porogen | | 0.804 | 1.040 | 1.029 | 0.636 | 0.820 |
| RED of resin and porogen | | 1.340 | 1.302 | 1.213 | 1.045 | 1.130 |
| Viscosity (mPa · s) | | a | a | a | a | a |

| | | Example | | | | |
|---|---|---|---|---|---|---|
| | | 2-6 | 2-7 | 2-8 | 2-9 | 2-10 |
| Polymerizable compound | X | | | | | |
| | Y | 28.0 | 10.0 | 10.0 | 48.0 | 48.0 |
| | Z | | | | | |
| | X + Y | | | | | |

TABLE 5-continued

| Solvent (porogen) | Ethanol | | | | | |
|---|---|---|---|---|---|---|
| | 2-Propanol | | | | | |
| | Methyl decanoate | | | | | |
| | Ethylene glycol monobutyl ether | | 89.5 | | 50.0 | |
| | Ethylene glycol monoisopropyl ether | | | 89.5 | | 50.0 |
| | Ethyl methyl carbonate | | | | | |
| | Dimethyl carbonate | | | | | |
| | Propylene carbonate | | | | | |
| | EC/DMC/EMC mixture + LiPF$_6$ | 70.0 | | | | |
| | 1-Bromonaphtalene | | | | | |
| | Tetrahydrofuran | | | | | |
| | Benzyl alcohol | | | | | |
| | Cyclohexanone | | | | | |
| | 1:3-Butane diol | | | | | |
| Polymerization initiator | Irgacure 819 | 2.0 | 0.5 | 0.5 | 2.0 | 2.0 |
| | RED of polymerizable compound and porogen | 0.749 | 1.040 | 1.029 | 1.040 | 1.029 |
| | RED of resin and porogen | 1.051 | 1.302 | 1.213 | 1.302 | 1.213 |
| | Viscosity (mPa·s) | a | a | a | a | a |

TABLE 6

| | | Comparative Example | | | | | | | |
|---|---|---|---|---|---|---|---|---|---|
| | | 2-1 | 2-2 | 2-3 | 2-4 | 2-5 | 2-6 | 2-7 | 2-8 |
| Polymerizable compound | X | | | | | | | | |
| | Y | 28.0 | 28.0 | 28.0 | 28.0 | 28.0 | 28.0 | 28.0 | 28.0 |
| | Z | | | | | | | | |
| | X + Y | | | | | | | | |
| Solvent (porogen) | Ethanol | 70.0 | | | | | | | |
| | 2-Propanol | | 70.0 | | | | | | |
| | Methyl decanoate | | | | | | | | |
| | Ethylene glycol monobutyl ether | | | | | | | | |
| | Ethylene glycol monoisopropyl ether | | | | | | | | |
| | Ethyl methyl carbonate | | | | | | | | |
| | Dimethyl carbonate | | | | | | | | |
| | Propylene carbonate | | | | | | | | 70.0 |
| | EC/DMC/EMC mixture + LiPF$_6$ | | | | | | | | |
| | 1-Bromonaphtalene | | | 70.0 | | | | | |
| | Tetrahydrofuran | | | | 70.0 | | | | |
| | Benzyl alcohol | | | | | 70.0 | | | |
| | Cyclohexanone | | | | | | 70.0 | | |
| | 1:3-Butane diol | | | | | | | 70.0 | |
| Polymerization initiator | Irgacure 819 | 2.0 | 2.0 | 2.0 | 2.0 | 2.0 | 2.0 | 2.0 | 2.0 |
| | RED of polymerizable compound and porogen | 1.644 | 1.387 | 0.768 | 0.608 | 0.985 | 0.167 | 1.754 | 0.997 |
| | RED of resin and porogen | 1.790 | 1.582 | 0.996 | 0.955 | 0.997 | 0.629 | 1.873 | 0.998 |
| | Viscosity (mPa·s) | — | — | a | a | a | a | — | a |

TABLE 7

| | | Example | | | | | |
|---|---|---|---|---|---|---|---|
| | | 3-1 | 3-2 | 3-3 | 3-4 | 3-5 | 3-6 |
| Polymerizable compound | X | | | | | | |
| | Y | | | | | | |
| | Z | 28.0 | 28.0 | 28.0 | 28.0 | 28.0 | 28.0 |
| | X + Y | | | | | | |
| Solvent (porogen) | Ethanol | 70.0 | | | | | |
| | 2-Propanol | | 70.0 | | | | |
| | Methyl decanoate | | | 70.0 | | | |
| | Ethylene glycol monobutyl ether | | | | 70.0 | | |
| | Ethylene glycol monoisopropyl ether | | | | | 70.0 | |

TABLE 7-continued

|  |  |  |  |  |  |  |  |
|---|---|---|---|---|---|---|---|
|  | Ethyl methyl carbonate |  |  |  |  |  | 70.0 |
|  | Dimethyl carbonate |  |  |  |  |  |  |
|  | Propylene carbonate |  |  |  |  |  |  |
|  | EC/DMC/EMC mixture + LiPF$_6$ |  |  |  |  |  |  |
|  | 1-Bromonaphtalene |  |  |  |  |  |  |
|  | Tetrahydrofuran |  |  |  |  |  |  |
|  | Benzyl alcohol |  |  |  |  |  |  |
|  | Cyclohexanone |  |  |  |  |  |  |
|  | 1:3-Butane diol |  |  |  |  |  |  |
| Polymerization initiator | Irgacure 819 | 2.0 | 2.0 | 2.0 | 2.0 | 2.0 | 2.0 |
| RED of polymerizable compound and porogen |  | 1.025 | 1.002 | 0.911 | 0.919 | 0.819 | 0.748 |
| RED of resin and porogen |  | 1.443 | 1.277 | 1.095 | 1.085 | 1.088 | 1.033 |
| Viscosity (mPa · s) |  | a | a | a | a | a | a |

|  |  | Example |  |  |  |  |  |
|---|---|---|---|---|---|---|---|
|  |  | 3-7 | 3-8 | 3-9 | 3-10 | 3-11 | 3-12 |
| Polymerizable compound | X |  |  |  |  |  |  |
|  | Y |  |  |  |  |  |  |
|  | Z | 28.0 | 28.0 | 10.0 | 10.0 | 48.0 | 48.0 |
|  | X + Y |  |  |  |  |  |  |
| Solvent (porogen) | Ethanol |  |  | 89.5 |  | 50.0 |  |
|  | 2-Propanol |  |  |  | 89.5 |  | 50.0 |
|  | Methyl decanoate |  |  |  |  |  |  |
|  | Ethylene glycol monobutyl ether |  |  |  |  |  |  |
|  | Ethylene glycol monoisopropyl ether |  |  |  |  |  |  |
|  | Ethyl methyl carbonate |  |  |  |  |  |  |
|  | Dimethyl carbonate | 70.0 |  |  |  |  |  |
|  | Propylene carbonate |  |  |  |  |  |  |
|  | EC/DMC/EMC mixture + LiPF$_6$ |  | 70.0 |  |  |  |  |
|  | 1-Bromonaphtalene |  |  |  |  |  |  |
|  | Tetrahydrofuran |  |  |  |  |  |  |
|  | Benzyl alcohol |  |  |  |  |  |  |
|  | Cyclohexanone |  |  |  |  |  |  |
|  | 1:3-Butane diol |  |  |  |  |  |  |
| Polymerization initiator | Irgacure 819 | 2.0 | 2.0 | 0.5 | 0.5 | 2.0 | 2.0 |
| RED of polymerizable compound and porogen |  | 0.796 | 0.669 | 1.025 | 1.002 | 1.025 | 1.002 |
| RED of resin and porogen |  | 1.085 | 1.112 | 1.443 | 1.277 | 1.443 | 1.277 |
| Viscosity (mPa · s) |  | a | a | a | a | a | a |

TABLE 8

|  |  | Comparative Example |  |  |  |  |  |
|---|---|---|---|---|---|---|---|
|  |  | 3-1 | 3-2 | 3-3 | 3-4 | 3-5 | 3-6 |
| Polymerizable compound | X |  |  |  |  |  |  |
|  | Y |  |  |  |  |  |  |
|  | Z | 28.0 | 28.0 | 28.0 | 28.0 | 28.0 | 28.0 |
|  | X + Y |  |  |  |  |  |  |
| Solvent (porogen) | Ethanol |  |  |  |  |  |  |
|  | 2-Propanol |  |  |  |  |  |  |
|  | Methyl decanoate |  |  |  |  |  |  |
|  | Ethylene glycol monobutyl ether |  |  |  |  |  |  |
|  | Ethylene glycol monoisopropyl ether |  |  |  |  |  |  |
|  | Ethyl methyl carbonate |  |  |  |  |  |  |
|  | Dimethyl carbonate |  |  |  |  |  |  |
|  | Propylene carbonate |  |  |  |  |  | 70.0 |
|  | EC/DMC/EMC mixture + LiPF$_6$ |  |  |  |  |  |  |
|  | 1-Bromonaphtalene | 70.0 |  |  |  |  |  |
|  | Tetrahydrofuran |  | 70.0 |  |  |  |  |
|  | Benzyl alcohol |  |  | 70.0 |  |  |  |
|  | Cyclohexanone |  |  |  | 70.0 |  |  |
|  | 1:3-Butane diol |  |  |  |  | 70.0 |  |

TABLE 8-continued

|  |  | Comparative Example | | | | | |
|---|---|---|---|---|---|---|---|
|  |  | 3-1 | 3-2 | 3-3 | 3-4 | 3-5 | 3-6 |
| Polymerization initiator | Irgacure 819 | 2.0 | 2.0 | 2.0 | 2.0 | 2.0 | 2.0 |
| RED of polymerizable compound and porogen | | 0.843 | 0.783 | 0.834 | 0.595 | 1.079 | 0.210 |
| RED of resin and porogen | | 0.552 | 0.861 | 0.777 | 0.706 | 1.459 | 0.988 |
| Viscosity (mPa · s) | | a | a | a | a | — | a |

TABLE 9

|  |  | Example | | | | | |
|---|---|---|---|---|---|---|---|
|  |  | 4-1 | 4-2 | 4-3 | 4-4 | 4-5 | 4-6 |
| Polymerizable compound | X | | | | | | |
|  | Y | | | | | | |
|  | Z | | | | | | |
|  | X + Y | 28.0 | 28.0 | 28.0 | 28.0 | 28.0 | 28.0 |
| Solvent (porogen) | Ethanol | 70.0 | | | | | |
|  | 2-Propanol | | 70.0 | | | | |
|  | Methyl decanoate | | | 70.0 | | | |
|  | Ethylene glycol monobutyl ether | | | | 70.0 | | |
|  | Ethylene glycol monoisopropyl ether | | | | | 70.0 | |
|  | Ethyl methyl carbonate | | | | | | 70.0 |
|  | Dimethyl carbonate | | | | | | |
|  | Propylene carbonate | | | | | | |
|  | EC/DMC/EMC mixture + LiPF$_6$ | | | | | | |
|  | 1-Bromonaphtalene | | | | | | |
|  | Tetrahydrofuran | | | | | | |
|  | Benzyl alcohol | | | | | | |
|  | Cyclohexanone | | | | | | |
|  | 1:3-Butane diol | | | | | | |
| Polymerization initiator | Irgacure 819 | 2.0 | 2.0 | 2.0 | 2.0 | 2.0 | 2.0 |
| RED of polymerizable compound and porogen | | 0.999 | 0.788 | 0.676 | 0.535 | 0.492 | 0.405 |
| RED of resin and porogen | | 1.854 | 1.609 | 1.331 | 1.292 | 1.220 | 1.037 |
| Viscosity (mPa · s) | | a | a | a | a | a | a |

|  |  | Example | | | | | |
|---|---|---|---|---|---|---|---|
|  |  | 4-7 | 4-8 | 4-9 | 4-10 | 4-11 | 4-12 |
| Polymerizable compound | X | | | | | | |
|  | Y | | | | | | |
|  | Z | | | | | | |
|  | X + Y | 28.0 | 28.0 | 28.0 | 10.0 | 10.0 | 10.0 |
| Solvent (porogen) | Ethanol | | | | 89.5 | | |
|  | 2-Propanol | | | | | 89.5 | |
|  | Methyl decanoate | | | | | | |
|  | Ethylene glycol monobutyl ether | | | | | | 89.5 |
|  | Ethylene glycol monoisopropyl ether | | | | | | |
|  | Ethyl methyl carbonate | | | | | | |
|  | Dimethyl carbonate | 70.0 | | | | | |
|  | Propylene carbonate | | 70.0 | | | | |
|  | EC/DMC/EMC mixture + LiPF$_6$ | | | 70.0 | | | |
|  | 1-Bromonaphtalene | | | | | | |
|  | Tetrahydrofuran | | | | | | |
|  | Benzyl alcohol | | | | | | |
|  | Cyclohexanone | | | | | | |
|  | 1:3-Butane diol | | | | | | |
| Polymerization initiator | Irgacure 819 | 2.0 | 2.0 | 2.0 | 0.5 | 0.5 | 0.5 |
| RED of polymerizable compound and porogen | | 0.393 | 0.393 | 0.499 | 0.999 | 0.788 | 0.535 |
| RED of resin and porogen | | 1.132 | 1.132 | 1.086 | 1.854 | 1.609 | 1.292 |
| Viscosity (mPa · s) | | a | a | a | a | a | a |

TABLE 9-continued

|  |  | Example | | | | |
|---|---|---|---|---|---|---|
|  |  | 4-13 | 4-14 | 4-15 | 4-16 | 4-17 |
| Polymerizable compound | X | | | | | |
|  | Y | | | | | |
|  | Z | | | | | |
|  | X + Y | 10.0 | 48.0 | 48.0 | 48.0 | 48.0 |
| Solvent (porogen) | Ethanol | | 50.0 | | | |
|  | 2-Propanol | | | 50.0 | | |
|  | Methyl decanoate | | | | | |
|  | Ethylene glycol monobutyl ether | | | | 50.0 | |
|  | Ethylene glycol monoisopropyl ether | 89.5 | | | | 50.0 |
|  | Ethyl methyl carbonate | | | | | |
|  | Dimethyl carbonate | | | | | |
|  | Propylene carbonate | | | | | |
|  | EC/DMC/EMC mixture + $LiPF_6$ | | | | | |
|  | 1-Bromonaphtalene | | | | | |
|  | Tetrahydrofuran | | | | | |
|  | Benzyl alcohol | | | | | |
|  | Cyclohexanone | | | | | |
|  | 1:3-Butane diol | | | | | |
| Polymerization initiator | Irgacure 819 | 0.5 | 2.0 | 2.0 | 2.0 | 2.0 |
| RED of polymerizable compound and porogen | | 0.492 | 0.999 | 0.788 | 0.535 | 0.492 |
| RED of resin and porogen | | 1.220 | 1.854 | 1.609 | 1.292 | 1.220 |
| Viscosity (mPa·s) | | a | a | a | a | a |

TABLE 10

|  |  | Comparative Example | | | | |
|---|---|---|---|---|---|---|
|  |  | 4-1 | 4-2 | 4-3 | 4-4 | 4-5 |
| Polymerizable compound | X | | | | | |
|  | Y | | | | | |
|  | Z | | | | | |
|  | X + Y | 28.0 | 28.0 | 28.0 | 28.0 | 28.0 |
| Solvent (porogen) | Ethanol | | | | | |
|  | 2-Propanol | | | | | |
|  | Methyl decanoate | | | | | |
|  | Ethylene glycol monobutyl ether | | | | | |
|  | Ethylene glycol monoisopropyl ether | | | | | |
|  | Ethyl methyl carbonate | | | | | |
|  | Dimethyl carbonate | | | | | |
|  | Propylene carbonate | | | | | |
|  | EC/DMC/EMC mixture + $LiPF_6$ | | | | | |
|  | 1-Bromonaphtalene | 70.0 | | | | |
|  | Tetrahydrofuran | | 70.0 | | | |
|  | Benzyl alcohol | | | 70.0 | | |
|  | Cyclohexanone | | | | 70.0 | |
|  | 1:3-Butane diol | | | | | 70.0 |
| Polymerization initiator | Irgacure 819 | 2.0 | 2.0 | 2.0 | 2.0 | 2.0 |
| RED of polymerizable compound and porogen | | 0.808 | 0.307 | 0.501 | 0.314 | 1.095 |
| RED of resin and porogen | | 0.996 | 0.915 | 0.985 | 0.599 | 1.944 |
| Viscosity (mPa·s) | | a | a | a | a | — |

Next, light transmission of the liquid composition, haze change rate, pore diameter measurement, resin porosity, and discharging stability were evaluated.

Light Transmission

The liquid composition of each of Examples and Comparative Examples were used to measure the light transmission according to the following procedure.

The prepared liquid composition was infused into a quartz cell and the transmission of light (visible light) having a wavelength of 550 nm of the liquid composition was measured while being stirred at 300 rpm using a stir bar. In this Example, when the light transmission was 30 percent or more, the polymerizable compound and the porogen were determined as compatible. When the light transmission was less than 30 percent, the polymerizable compound and the porogen were determined as incompatible. Various conditions regarding the measurement of light transmission are as follows:

Quartz cell: Special micro cell with screw cap (trade name: M25-UV-2)

Transmission measuring device: USB4000, manufactured by Ocean Optics, Inc

Rate of stirring: 300 rpm

Measuring wavelength: 550 nm

Reference: Light transmission measured at a wavelength of 550 nm with the quartz cell filled with air (transmission: 100 percent)

The results of light transmission are shown in Tables 11 to 14 according to the following evaluation criteria.

Evaluation Criteria a: Light transmission is 30 percent or more b: Light transmittance is less than 30 percent Haze Change Rate Using the adjusted liquid compositions of Examples and Comparative Examples, the haze value (cloudiness) of the element for measuring haze was measured according to the following procedure.

Preparation of Element for Measuring Haze

Resin particulates were uniformly dispersed on an alkali-free glass substrate by spin coating to obtain a gap agent. Subsequently, the substrate coated with the gap agent and an alkali-free glass substrate to which no gap agent was applied were attached to each other in such a manner that the gap agent was sandwiched between the substrate and the alkali-free glass substrate. Next, the prepared liquid composition was filled into between the attached substrates utilizing the capillary phenomenon to produce an element for measuring haze before UV irradiation. Subsequently, the element for measuring haze before UV was irradiated with UV to cause the composition for measuring haze to cure. Finally, the periphery of the substrate was sealed with a sealant to prepare an element for measuring haze. Various conditions at the time of preparation are as follows.

Alkali-free glass substrate: OA-10G, 40 mm, t=0.7 mm, manufactured by Nippon Electric Glass Co., Ltd.

Gap agent: Resin fine particles Micropearl GS-L100, average particle size 100 μm, manufactured by SEKISUI CHEMICAL CO., LTD.

Spin coating conditions: Amount of liquid dispersion 150 μL, rate of rotation 1000 rpm, time of rotation 30 s Filled liquid composition: 160 μL UV irradiation conditions: UV-LED is used as a light source, light source wavelength 365 nm, irradiation intensity 30 mW/cm$^2$, time of irradiation 20 seconds Sealant: TB3035B (manufactured by ThreeBond Co., Ltd.)

Measurement of Haze Value (Cloudiness)

The haze value (cloudiness) was measured using the prepared element for measuring haze before UV irradiation and the element for measuring haze. Using the measurement value for the element for measuring haze before UV irradiation as a reference (haze value 0), the increasing ratio of the measurement value (haze value) for the element for measuring haze to the measurement value (haze value) for the element for measuring haze before UV irradiation was calculated. In this Example, when the increase ratio of the haze value was 1.0 percent or more, the resin and the porogen were determined as incompatible. When the increase ratio was less than 1.0 percent, the resin and the porogen were determined as compatible. The instruments used for the measurement are as follows.

Haze measuring device: Haze meter NDH5000, manufactured by Nippon Denshoku Industries Co., Ltd.

The results of the increasing ratio of haze value are shown in Tables 11 to 14 according to the following evaluation criteria. Note that in the evaluation of the light transmission described above, when the component of the liquid composition was determined as incompatible, the liquid composition was not subject to an evaluation and—was shown in Tables 11 to 14.

Evaluation Criteria a: Increase ratio of haze value is 1.0 percent or more b: Increase ratio of haze value is less than 1.0 percent Measurement of Pore Diameter After applying 20 μl of the liquid composition of each Example and Comparative Example onto copper foil with a thickness of 8 μm as a substrate using a dispenser (micro-determination dispenser NANO MASTER SMP-II, manufactured by Musashi Engineering, Inc.), a polymerizable compound was polymerized by irradiating with UV in an $N_2$ atmosphere. Next, using a hot plate, the solvent was removed by heating at 100 degrees C. for one minute to form a resin. The UV irradiation conditions are as follows:

Light source: UV-LED (FJ800, manufactured by Phoseon Technology)

Wavelength of light source: 365 nm

Irradiation intensity: 30 mW/cm$^2$

Irradiation time: 20 seconds

Device for measuring amount of UV irradiation: UV integrated light meter UIT-250, manufactured by Ushio Inc.

Next, the surface of the produced resin was observed with an SEM. As a result, in the evaluation of the light transmission described above, all the liquid compositions were confirmed to form resins having a pore size of from 0.01 to 10 μm excluding the liquid compositions containing components determined as not compatible (evaluated as b for light transmission in Tables 11 to 14). The formed resin having pores had a co-continuous structure in which a plurality of pores in the resin were continuously connected. In addition, in the evaluation of the light transmission described above, the liquid compositions containing components determined as not compatible (evaluated as b for the evaluation of light transmission in Tables 11 to 14) did not form a resin having a pore of from 0.01 to 10

Porosity of Resin

In the same manner as the evaluation of the measuring of the pore diameter mentioned above, resins were formed using the liquid compositions of each Example and Comparative Example.

Next, after filling the produced resin with an unsaturated aliphatic acid (commercially available butter) and osmium staining, the internal cross-section structure was cut out with FIB and the porosity in the resin was measured using an SEM. The results of porosity of the resin are shown in Tables 11 to 14 according to the following evaluation criteria. Note that the produced resins which were not porous resins were not subject to the evaluation and—was shown in Tables 11 to 14.

Evaluation Criteria a: Porosity is 50 percent or more b: Porosity is from 30 to less than 50 percent c: Porosity is less than 30 percent Discharging Stability The liquid composition of each Example and Comparative Example was continuously discharged for 60 minutes using an inkjet discharging device equipped with a GENS head (manufactured by Ricoh Printing Systems Co., Ltd.), the number of nozzles of nozzle omission was counted, and discharging stability was not evaluated based on the following evaluation criteria. For the inkjet discharging device, the drive frequency and the heating temperature were appropriately adjusted for each ink and the discharging amount of ink per discharging was set to 2 pL. Nozzle omission means clogged nozzles that cannot discharge ink droplets. The results of discharging stability are shown in Tables 11 to 14 according to the following evaluation criteria. Note that in the evaluation of the light transmission described above, when the component of the liquid composition was determined as incompatible, the liquid composition was not subject to an evaluation and "-" was shown in Tables 11 to 14.

Evaluation Criteria a: Number of nozzles of nozzle omission is less than 5 b: Number of nozzles of nozzle omission is not less than 5 although dischargeable nozzles are present c: All nozzles are not dischargeable

TABLE 11

| | Light transmission | Haze change ratio | Porosity of resin | Discharging stability |
|---|---|---|---|---|
| Example 1-1 | a | a | a | a |
| Example 1-2 | a | a | a | a |
| Example 1-3 | a | a | b | a |
| Example 1-4 | a | a | b | a |
| Example 1-5 | a | a | a | a |
| Example 1-6 | a | a | a | a |
| Example 1-7 | a | a | a | a |
| Example 1-8 | a | a | a | a |
| Example 1-9 | a | a | a | a |
| Example 1-10 | a | a | a | a |
| Example 1-11 | a | a | a | a |
| Example 1-12 | a | a | a | a |
| Example 1-13 | a | a | a | a |
| Example 1-14 | a | a | a | a |
| Example 1-15 | a | a | b | a |
| Comparative Example 1-1 | a | b | c | a |
| Comparative Example 1-2 | a | b | c | a |
| Comparative Example 1-3 | a | b | c | a |
| Comparative Example 1-4 | a | b | c | a |
| Comparative Example 1-5 | b | — | — | — |

TABLE 12

| | Light Transmission | Haze change ratio | Porosity of Resin | Discharging stability |
|---|---|---|---|---|
| Example 2-1 | a | a | a | a |
| Example 2-2 | a | a | a | a |
| Example 2-3 | a | a | a | a |
| Example 2-4 | a | a | b | a |
| Example 2-5 | a | a | b | a |
| Example 2-6 | a | a | a | a |
| Example 2-7 | a | a | b | a |
| Example 2-8 | a | a | a | a |
| Example 2-9 | a | a | b | a |
| Example 2-10 | a | a | b | a |
| Comparative Example 2-1 | b | — | — | — |
| Comparative Example 2-2 | b | — | — | — |
| Comparative Example 2-3 | a | b | c | a |
| Comparative Example 2-4 | a | b | c | a |
| Comparative Example 2-5 | a | b | c | a |
| Comparative Example 2-6 | a | b | c | a |
| Comparative Example 2-7 | b | — | — | — |
| Comparative Example 2-8 | a | b | c | a |

TABLE 13

| | Light Transmission | Haze change ratio | Porosity of Resin | Discharging stability |
|---|---|---|---|---|
| Example 3-1 | a | a | a | a |
| Example 3-2 | a | a | a | a |
| Example 3-3 | a | a | a | a |
| Example 3-4 | a | a | b | a |
| Example 3-5 | a | a | b | a |
| Example 3-6 | a | a | b | a |
| Example 3-7 | a | a | b | a |
| Example 3-8 | a | a | a | a |
| Example 3-9 | a | a | a | a |
| Example 3-10 | a | a | b | a |
| Example 3-11 | a | a | a | a |
| Example 3-12 | a | a | a | a |
| Comparative Example 3-1 | a | b | c | a |
| Comparative Example 3-2 | a | b | c | a |
| Comparative Example 3-3 | a | b | c | a |
| Comparative Example 3-4 | a | b | c | a |
| Comparative Example 3-5 | b | — | — | — |
| Comparative Example 3-6 | a | b | c | a |

TABLE 14

| | Light Transmission | Haze change ratio | Porosity of Resin | Discharging stability |
|---|---|---|---|---|
| Example 4-1 | a | a | a | a |
| Example 4-2 | a | a | a | a |
| Example 4-3 | a | a | a | a |
| Example 4-4 | a | a | a | a |
| Example 4-5 | a | a | a | a |
| Example 4-6 | a | a | b | a |
| Example 4-7 | a | a | b | a |
| Example 4-8 | a | a | b | a |
| Example 4-9 | a | a | b | a |
| Example 4-10 | a | a | a | a |
| Example 4-11 | a | a | a | a |
| Example 4-12 | a | a | a | a |
| Example 4-13 | a | a | a | a |
| Example 4-14 | a | a | a | a |
| Example 4-15 | a | a | a | a |
| Example 4-16 | a | a | b | a |
| Example 4-17 | a | a | b | a |
| Comparative Example 4-1 | a | b | c | a |
| Comparative Example 4-2 | a | b | c | a |
| Comparative Example 4-3 | a | b | c | a |
| Comparative Example 4-4 | a | b | c | a |
| Comparative Example 4-5 | b | — | — | — |

As seen in the results shown in Tables 11 to 14, when the relative energy difference (RED) 2 calculated based on the relationship 2 above from the Hansen solubility parameter C of the polymerizable compound, the interaction radius D of the polymerizable compound, and the Hansen solubility parameter of the solvent (porogen) is 1.05 or less, it indicates that the polymerizable compound and the solvent (porogen) are highly compatible. In addition, when the relative energy difference (RED) 1 calculated based on the relationship 1 above from the Hansen solubility parameter A of the resin formed by polymerization of the polymerizable compound, the interaction radius B of the resin, and the Hansen solubility parameter of the solvent (porogen) was 1.00 or greater, it means that compatibility between the resin formed by the polymerization of a polymerizable compound and the solvent (porogen) is low.

This means that, due to the selection of a suitable combination of a polymerizable compound and a solvent (porogen), the polymerizable compound and the solvent (porogen) changes from a compatible state to an incompatible state in accordance with the polymerization reaction derived from UV irradiation, which causes phase separation, thereby forming a porous resin. Specifically, upon UV irradiation, the polymerizable compound is polymerized, gradually forming a resin. During this process, solubility of the growing resin in the solvent (porogen) decreases, which causes phase separation. As a result, the resin is separated from the solution and finally forms a network structure having a porous structure with pores filled with the solvent (porogen). This is considered to increase the haze value. Moreover, the porogen is removed by drying the network structure, thereby obtaining a porous resin having a high porosity.

In addition, this was true not only in the case in which one type polymerizable compound was used but also the case in which two or more types of polymerizable compounds were mixed.

In the present embodiment, although a dispersion composition containing a dispersion in a liquid composition is suitable, a non-dispersion composition containing no dispersion in a liquid composition is preferable as in Examples. If the liquid composition is a non-dispersion composition, the liquid composition can be used in an application device that applies various types of liquid compositions. For example, it is preferable because it can be stably used in an inkjet method which is required to maintain discharging stability.

Moreover, all the porous resins formed using the liquid composition of Examples were white and confirmed to be usable as white ink. Furthermore, discharging stability of the liquid compositions of Examples were excellent when the liquid compositions were discharged by an inkjet discharging device. The liquid compositions were confirmed to be suitably usable as white ink discharged in the inkjet method.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A method of manufacturing a porous resin, the method comprising:
    discharging a liquid composition that can form the porous resin having a pore size of from 0.01 to 10 μm, to obtain a discharged liquid composition; and
    curing the discharged liquid composition,
    wherein the liquid composition comprises a polymerizable compound and a solvent which is a porogen,
    wherein the liquid composition has a viscosity of from 1 to 30 mPa·s at 25 degrees C., and
    wherein the liquid composition contains a liquid that is not a porogen in a proportion of from 0 to 10.0 percent by mass of the total amount of the liquid composition.

2. The method of claim 1, wherein the liquid composition comprises:
    from 10.0 to 50.0 percent by mass of the polymerizable compound, and
    from 50.0 to 90.0 percent by mass of the solvent.

3. The method of claim 1, wherein the liquid composition has a viscosity of from 1 to 25 mPa·s at 25 degrees C.

4. The method of claim 1, wherein the polymerizable compound comprises a (meth)acryloyl group or a vinyl group.

5. The method of claim 1, wherein the porous resin has a porosity of 30 percent or higher.

6. The method of claim 1, wherein the porous resin is a monolith comprising multiple continuously connected pores.

7. The method of claim 1, wherein the liquid composition further comprises an electrolyte.

8. A The method of claim 1, wherein the solvent comprises at least one compound selected from the group consisting of polypropylene carbonate, ethylmethyl carbonate, dimethyl carbonate, and ethylene carbonate.

9. The method of claim 1, wherein the liquid composition when stirred transmits at least 30 percent of incident light having a wavelength of 550 nm.

10. The method of claim 1, wherein the liquid composition comprises: from 20.0 to 40.0 percent by mass of the polymerizable compound, and from 60.0 to 80.0 percent by mass of the solvent.

11. The method of claim 2, wherein the polymerizable compound comprises a (meth)acryloyl group.

12. The method of claim 2, wherein the polymerizable compound comprises a vinyl group.

13. The method of claim 2, wherein the solvent comprises at least one compound selected from the group consisting of polypropylene carbonate, ethylmethyl carbonate, dimethyl carbonate, and ethylene carbonate.

14. The method of claim 4, wherein the solvent comprises at least one compound selected from the group consisting of polypropylene carbonate, ethylmethyl carbonate, dimethyl carbonate, and ethylene carbonate.

15. The method of claim 5, wherein the solvent comprises at least one compound selected from the group consisting of polypropylene carbonate, ethylmethyl carbonate, dimethyl carbonate, and ethylene carbonate.

16. The method according to claim 1, wherein when an element comprising the liquid composition is cured, a haze value of the element increased by 1.0 percent or more.

17. The method according to claim 1, wherein the polymerizable compound is tricyclodecane dimethanol diacrylate.

18. The method according to claim 1, wherein the polymerizable compound is ε-caprolactone-modified tri-(2-acryloxyethyl)isocyanurate.

19. The method according to claim 1, wherein the polymerizable compound is pentaerythritol tetraacrylate.

20. The method according to claim 1, wherein the liquid composition contains the liquid that is not a porogen in a proportion of from 0 to 5.0 percent by mass of the total amount of the liquid composition.

21. The method according to claim 1, wherein the liquid composition contains the liquid that is not a porogen in a proportion of from 0 to 1.0 percent by mass of the total amount of the liquid composition.

* * * * *